(12) United States Patent
Takeda

(10) Patent No.: US 12,513,266 B2
(45) Date of Patent: Dec. 30, 2025

(54) PROJECTION DEVICE AND METHOD OF CONTROLLING PROJECTION DEVICE

(71) Applicant: SEIKO EPSON CORPORATION, Tokyo (JP)

(72) Inventor: Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 552 days.

(21) Appl. No.: 17/956,345

(22) Filed: Sep. 29, 2022

(65) Prior Publication Data

US 2023/0102935 A1 Mar. 30, 2023

(30) Foreign Application Priority Data

Sep. 30, 2021 (JP) .................................. 2021-160806

(51) Int. Cl.
  H04N 9/31 (2006.01)
  G01B 11/25 (2006.01)

(52) U.S. Cl.
  CPC ....... H04N 9/3129 (2013.01); G01B 11/2518 (2013.01)

(58) Field of Classification Search
  CPC .... G03B 21/00; G03B 21/145; G03B 21/208; G03B 21/2013; G03B 21/2033; G03B 21/2066; G01B 11/25; G01B 11/2518; H04N 9/315; H04N 9/3129; H04N 9/3138; H04N 9/3161; H04N 9/3164
  See application file for complete search history.

(56) References Cited

U.S. PATENT DOCUMENTS

| | | | |
|---|---|---|---|
| 9,753,298 B2* | 9/2017 | Liu ................... | G03B 21/2033 |
| 10,950,199 B1* | 3/2021 | Buckley ................... | G06T 5/77 |
| 2006/0017653 A1* | 1/2006 | Tsao ...................... | H04N 13/395 |
| | | | 345/6 |
| 2006/0233208 A1 | 10/2006 | Takeda | |
| 2012/0188519 A1* | 7/2012 | Willett ................. | G03B 21/204 |
| | | | 353/31 |
| 2013/0016413 A1 | 1/2013 | Saeedi et al. | |
| 2013/0300948 A1* | 11/2013 | Jannard ................ | H04N 9/3164 |
| | | | 348/756 |
| 2019/0116346 A1* | 4/2019 | Hashimoto ........ | G02B 13/0005 |
| 2019/0260958 A1* | 8/2019 | Wada ....................... | H04N 9/31 |

FOREIGN PATENT DOCUMENTS

| | | |
|---|---|---|
| CN | 104503195 A | 4/2015 |
| CN | 104898377 A | 9/2015 |
| JP | 2003-172900 A | 6/2003 |
| JP | 2006-300981 | 11/2006 |
| JP | 2011-169988 A | 9/2011 |

\* cited by examiner

*Primary Examiner* — Sultan Chowdhury
(74) *Attorney, Agent, or Firm* — Oliff PLC

(57) ABSTRACT

A projection device according to the present disclosure includes a light emission display panel in which a plurality of pixels including a light emission element are arranged in a matrix shape, a scanning mirror configured to reflect, toward a scanned surface, imaging light emitted from the light emission display panel and performs two-dimensional scanning of the reflected imaging light on the scanned surface, and a projection optical system configured to guide the imaging light from the light emission display panel to the scanning mirror.

8 Claims, 22 Drawing Sheets

PROJECTION DEVICE AND METHOD OF CONTROLLING PROJECTION DEVICE

The present application is based on, and claims priority from JP Application Serial Number 2021-160806, filed Sep. 30, 2021, the disclosure of which is hereby incorporated by reference herein in its entirety.

BACKGROUND

1. Technical Field

The present disclosure relates to a projection device and a method of controlling a projection device.

2. Related Art

JP-A-2011-169988 discloses a projection-type display device that projects a picture image with a laser array arranged in a line shape and a scanner.

A scanning angle and a scanning frequency of the scanner are in inverse proportion to each other, and hence the scanning frequency is reduced as the scanning angle is increased for achieving display on a large screen. In other words, a frame rate of a picture image is disadvantageously low. For an image large in size in a longitudinal direction (Y-axis direction), the scanner is increased in size in the longitudinal direction, which also increases an optical system. For example, in order to perform display of a 4k image, approximately 2,000 pixels are required in the longitudinal direction. In this case, even when a pixel size is 2 μm in the longitudinal direction, a panel having a size of 4 mm in the longitudinal direction is required. Thus, along with increase of the panel size, the scanner is also increased in size.

SUMMARY

In order to solve the above-mentioned problem, a projection device according to one aspect of the present disclosure includes a light emission display panel in which a plurality of pixels including a light emission element are arranged in a matrix shape, a scanning mirror configured to reflect, toward a scanned surface, imaging light emitted from the light emission display panel and perform two-dimensional scanning of the reflected imaging light on the scanned surface, and a projection optical system configured to guide the imaging light from the light emission display panel to the scanning mirror.

A method of controlling a projection device according to one aspect of the present disclosure is a method of controlling a projection device that includes a light emission display panel in which a plurality of pixels including a light emission element are arranged in a matrix shape, a scanning mirror, and a projection optical system configured to guide imaging light from the light emission display panel to the scanning mirror, wherein the scanning mirror reflects, toward a scanned surface, the imaging light emitted from the light emission display panel and performs two-dimensional scanning of the reflected imaging light on the scanned surface.

DESCRIPTION OF EXEMPLARY EMBODIMENTS

Figure 1:
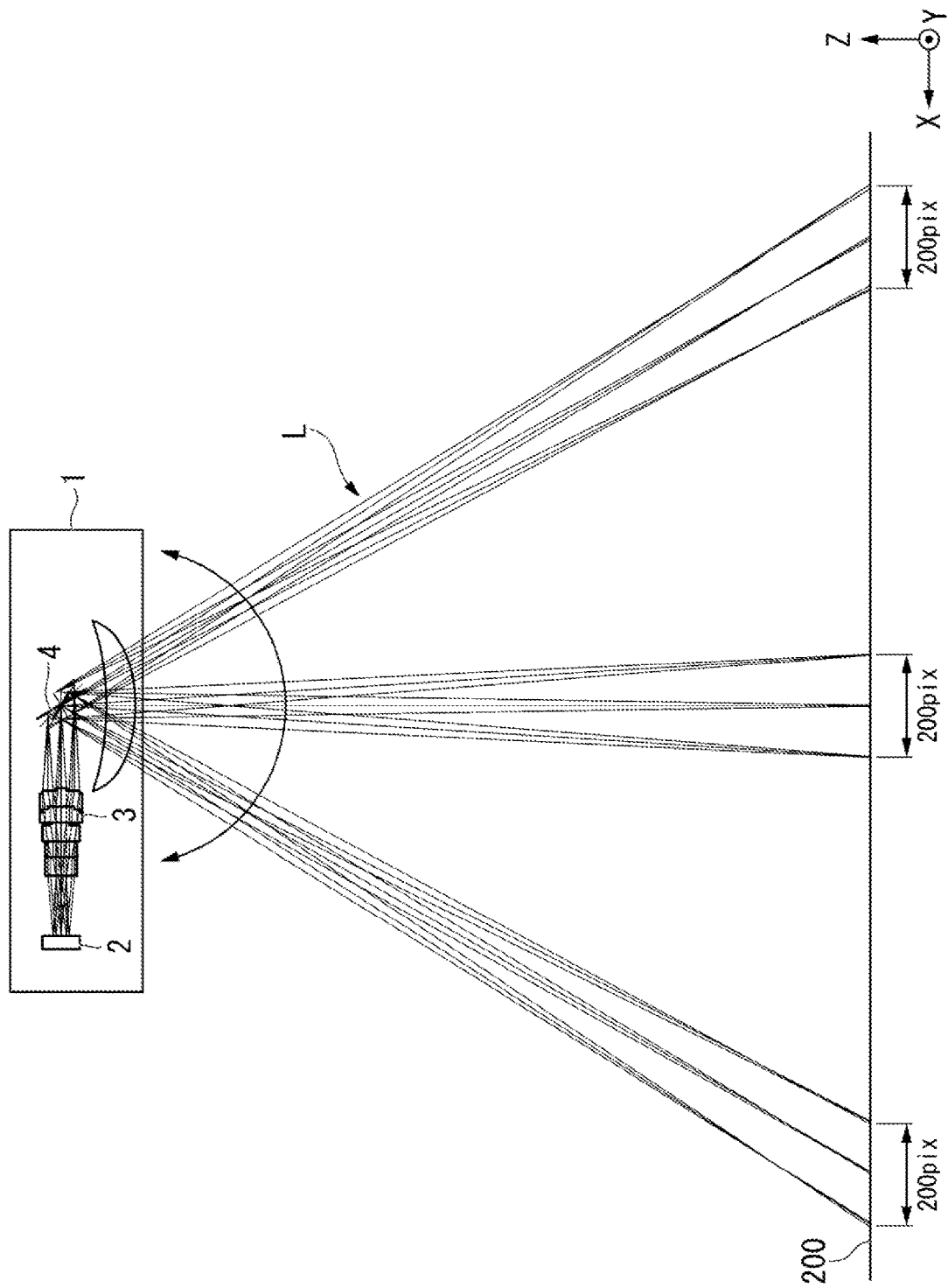
FIG. 1 is a diagram schematically illustrating an entire structure of a projection device according to one exemplary embodiment of the present disclosure.

With reference to the drawings, one exemplary embodiment of the present disclosure is described below.

Note that, in the drawings, the dimensions of some components may be scaled differently for ease of understanding for the components.

FIG. 1 is a diagram schematically illustrating an entire structure of a projection device 1 according to the present exemplary embodiment. As illustrated in FIG. 1, the projection device 1 according to the present exemplary embodiment is a projection-type display device that includes a light emission display panel 2, a projection optical system 3, and a scanning mirror 4, and displays an image on a scanned surface 200 by projecting imaging light L toward the scanned surface 200 and perform two-dimensional scanning of the imaging light L on the scanned surface 200. The scanned surface 200 is a surface of an object onto which the imaging light L is projected. The scanned surface 200 may be a surface of a projector screen or a wall surface.

In each of the drawings, an XYZ coordinate system is given as appropriate as a three-dimensional orthogonal coordinate system. A Z-axis direction is a direction orthogonal to the scanned surface 200. An XY plane including an X-axis direction and a Y-axis direction that are orthogonal to each other is a plane parallel to the scanned surface 200. In the following description, a direction parallel to the X-axis direction is referred to as a "lateral direction", and a direction parallel to the Y-axis direction is referred to as a "longitudinal direction" in some cases. In the lateral direction, a positive side (+X side) is referred to as a "right side", and a negative side (−X side) is referred to as a "left side" in some cases. Moreover, in the longitudinal direction, a positive side (+Y side) is referred to as an "upper side", and a negative side (−Y side) is referred to as a "lower side" in some cases.

Note that the lateral direction, the longitudinal direction, the right side, the left side, the upper side, and the lower side are merely names for describing a relative positional relationship of the respective elements, and an actual arrangement relationship or the like may be an arrangement relationship or the like other than the arrangement relationship or the like given with those names.

Figure 2:
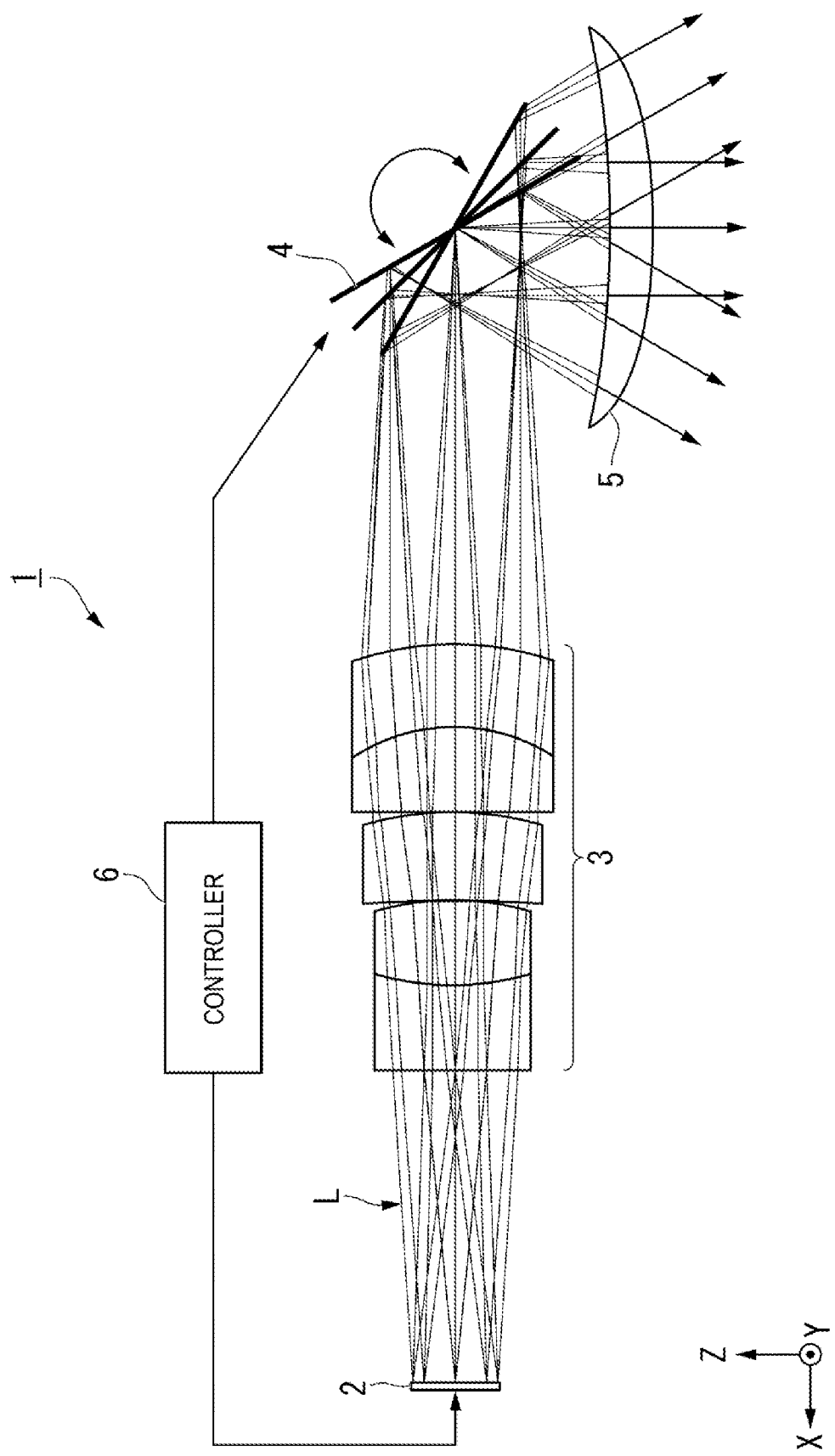
FIG. 2 is a diagram schematically illustrating a main configuration of the projection device.

FIG. 2 is a diagram schematically illustrating a main configuration of the projection device 1 according to the present exemplary embodiment. As illustrated in FIG. 2, the projection device 1 according to the present exemplary embodiment includes the light emission display panel 2, the projection optical system 3, the scanning mirror 4, an fθ lens 5, and a controller 6 (control unit).

The light emission display panel 2 is a light emission display panel in which a plurality of pixels including light emission elements are arranged in a matrix shape. As one example, the light emission display panel 2 in the present exemplary embodiment is a self light emission type electro-optical device such as an Organic Light Emitting Diode (OLED) panel, a Micro Light Emitting Diode (μLED) panel, or a Laser Diode (LD) panel. The self light emission type electro-optical device is a device that spontaneously emits light with an electronic energy supplied from outside, without requiring a light source such as a backlight.

The light emission display panel 2 include a plurality of pixels arranged in a matrix shape, which is described later in detail. The number of pixels of the light emission display panel 2 in a vertical direction (row direction) is m, and the number of pixels of the light emission display panel 2 in a horizontal direction (column direction) is n. Each of m and n is an integer equal to or greater than 2. As one example, in the present exemplary embodiment, the number m of pixels of the light emission display panel 2 in the vertical direction is 200, and the number n of pixels of the light emission display panel 2 in the horizontal direction is 200.

Each of the pixels of the light emission display panel 2 includes a plurality of light emission elements that emit visible light of different colors. As one example, each of the pixels in the present exemplary embodiment includes one red light emission element that emits red-colored light, one green light emission element that emits green-colored light, and two blue light emission elements that emit blue-colored light, which makes four light emission elements in total. Light emission luminance of the four light emission elements of each of the pixels is controlled by the controller 6. With this, a colored image is displayed on the light emission display panel 2. The light emission display panel 2 emits, to the projection optical system 3, the imaging light L indicating an image displayed on the light emission display panel 2. The imaging light L contains visible light (colored light) emitted from the four light emission elements provided to each of the pixels of the light emission display panel 2.

Figure 3:
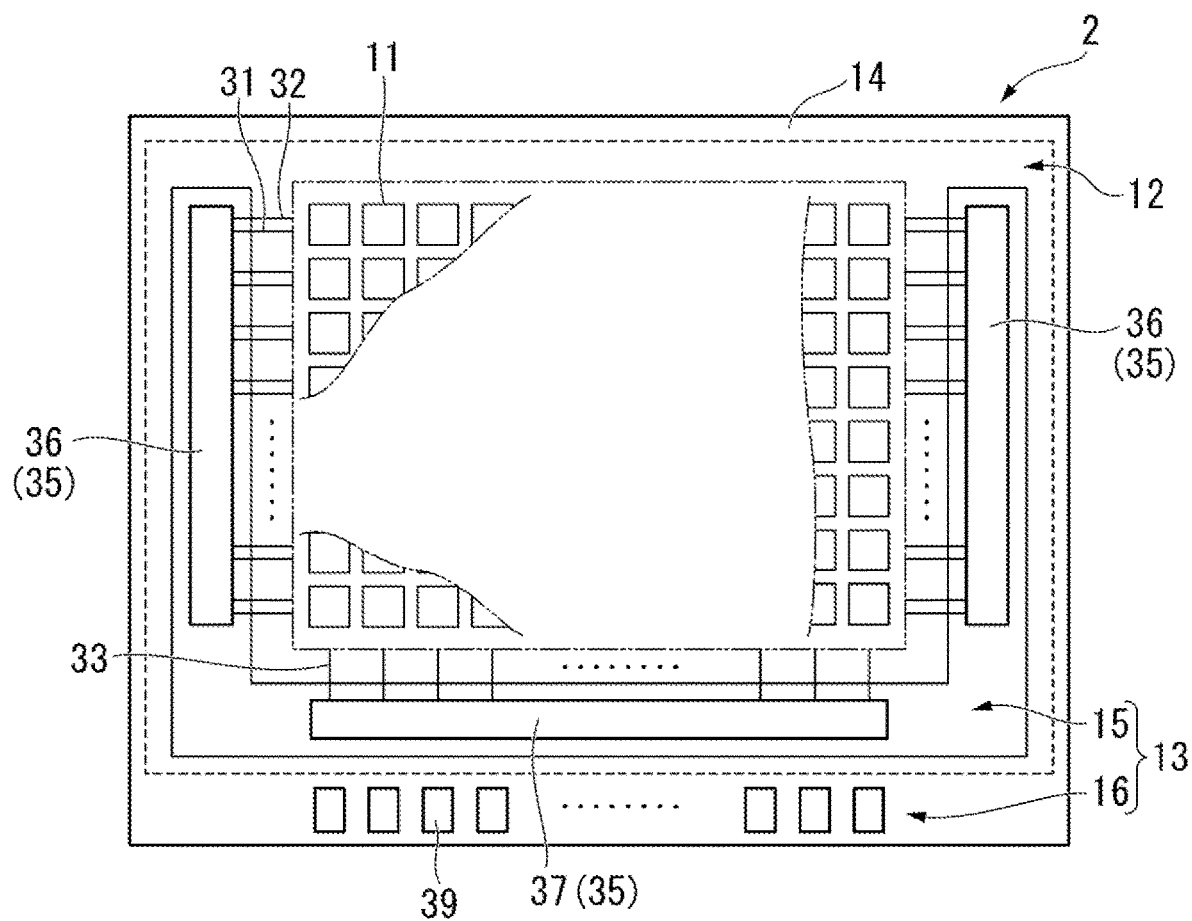
FIG. 3 is a schematic configuration diagram illustrating an entire structure of a light emission display panel provided to the projection device.
Figure 4:
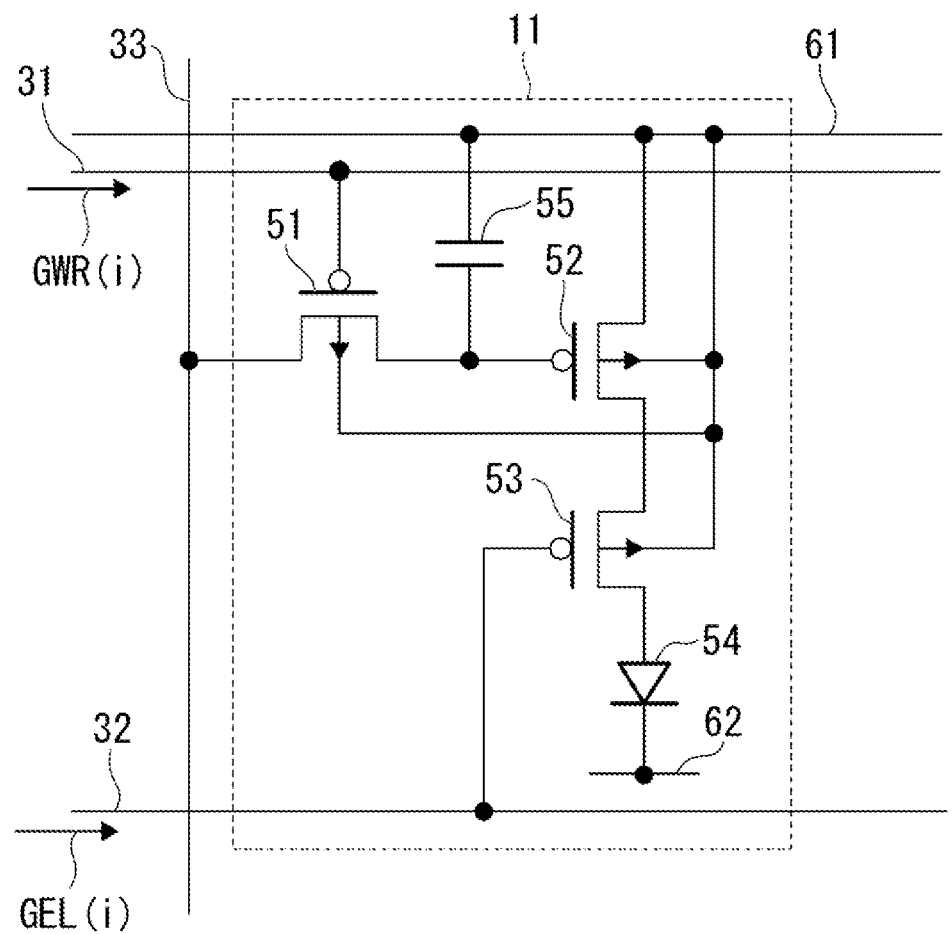
FIG. 4 is an equivalent circuit diagram illustrating one example of a circuit configuration of each pixel provided to the light emission display panel.

FIG. 3 is a schematic configuration diagram illustrating an entire structure of the light emission display panel 2. As illustrated in FIG. 3, a substrate 14 of the light emission display panel 2 is provided with a pixel region 12 and a non-pixel region 13. The non-pixel region 13 includes a peripheral region 15 and a mounting region 16. The pixel region 12 is a rectangular region in which m×n pixels 11 are arranged in a matrix shape. The pixel region 12 are provided with m scanning lines 31 extending in the horizontal direction, m control lines 32 extending in the horizontal direction in correspondence with the respective scanning lines 31, and n data lines 33 extending in the vertical direction. As described above, in the present exemplary embodiment, m and n are 200. The pixel 11 has a circuit configuration as illustrated in FIG. 4. A circuit configuration of the pixel 11 is described later.

The peripheral region 15 is a rectangular frame-shaped region that surrounds the pixel region 12. Three driving circuits 35 are provided in the peripheral region 15. The three driving circuits 35 are circuits that drive each of the pixels 11 in the pixel region 12. The driving circuits 35 include two scanning line driving circuits 36 and a data line driving circuit 37. The mounting region 16 is provided on a side opposite to the pixel region 12 across the peripheral region 15, in other words, on the outer side of the peripheral region 15. A plurality of mounting terminals 39 are provided in the mounting region 16. Various signals such as a control signal and a power source potential, which are required for driving each of the pixels 11, are supplied from the controller 6 to the mounting terminals 39 via a flexible cable that is not illustrated.

FIG. 4 is an equivalent circuit diagram illustrating one example of a circuit configuration of each of the pixels 11. Each of the pixels 11 has a common circuit configuration. Thus, in the following description, a circuit configuration of the pixel 11 positioned at the i-th row and the j-th column is given as an example. Note that "i" is a reference symbol generally indicating the number of the row in which the pixel 11 is arranged, and is an integer equal to or greater than 1 and equal to or smaller than m. "j" is a reference symbol generally indicating the number of the column at which the pixel 11 is arranged, and is an integer equal to or greater than 1 and equal to or smaller than n.

Note that, in the present exemplary embodiment, the four light emission elements are provided in each of the pixels 11. Thus, in a strict sense, a plurality of data lines 33 are required in one pixel 11. However, for simplification of the description, a circuit configuration for driving one light emission element of the four light emission elements provided in each of the pixels 11 is representatively described below.

As illustrated in FIG. 4, the pixel 11 includes a selection transistor 51, a driving transistor 52, a light emission control transistor 53, a light emission element 54, and a retention capacitor 55. In the present exemplary embodiment, each of the selection transistor 51, the driving transistor 52, and the light emission control transistor 53 is a P-channel type MOS-FET.

A gate electrode of the selection transistor 51 is electrically coupled to the scanning line 31 of the i-th row. The other one of source and drain regions of the selection transistor 51 is electrically coupled to the data line 33 of the j-th column. One of the source and drain regions of the selection transistor 51 is electrically coupled to a gate electrode of the driving transistor 52 and one electrode of the retention capacitor 55. A back gate of the selection transistor 51 is electrically coupled to a power source wiring line 61 to which a power source potential is applied.

The gate electrode of the driving transistor 52 is electrically coupled to the one of the source and drain regions of the selection transistor 51 and the one electrode of the retention capacitor 55. One of source and drain regions of the driving transistor 52 is electrically coupled to the power source wiring line 61. The other one of the source and drain regions of the driving transistor 52 is electrically coupled to one of source and drain regions of the light emission control transistor 53. A back gate of the driving transistor 52 is electrically coupled to the power source wiring line 61.

A gate electrode of the light emission control transistor 53 is electrically coupled to the control line 32 of the i-th row. One of the source and drain regions of the light emission control transistor 53 is electrically coupled to the other one of the source and drain regions of the driving transistor 52. The other one of the source and drain regions of the light emission control transistor 53 is electrically coupled to an anode of the light emission element 54. A back gate of the light emission control transistor 53 is electrically coupled to the power source wiring line 61.

The light emission element 54 is a light emission element that emits visible light having a predetermined color. The light emission element 54 has a configuration in which a light emission layer is sandwiched between the anode and a cathode, and is an OLED, a μLED, or an LD, for example. The anode of the light emission element 54 is electrically coupled to the other one of the source and drain regions of the light emission control transistor 53. The cathode of the light emission element 54 is electrically coupled to a common wiring line 62 to which a common potential is applied.

The retention capacitor 55 is a capacitor for holding a gate potential of the driving transistor 52. The one electrode of the retention capacitor 55 is electrically coupled to the one of the source and drain regions of the selection transistor 51 and the gate electrode of the driving transistor 52. The other electrode of the retention capacitor 55 is electrically coupled to the power source wiring line 61. Note that, as the retention capacitor 55, a capacitor parasitic to the gate electrode of the driving transistor 52 may be used, or a capacitor, which is formed at the substrate 14 by sandwiching an insulating layer between conductive layers different from each other, may be used.

In the pixel circuit configured as described above, when a scanning signal GWR(i) supplied to the scanning line 31 of the i-th row is at a high level, the selection transistor 51 is in an off state. Meanwhile, the scanning signal GWR(i) is at a low level, the selection transistor 51 is in an on state. When the selection transistor 51 is in an on state, a charging current flows to the retention capacitor 55 in accordance with a potential difference Vd between a potential of the data line 33 and a potential of the power source wiring line 61. With this, the retention capacitor 55 is charged until an inter-electrode voltage of the retention capacitor 55 is equal to the potential difference Vd.

A current flowing between the other one of the source and drain regions and the one of the source and drain regions of the driving transistor 52 depends on the gate potential of the driving transistor 52. The gate potential of the driving transistor 52 is equal to a voltage held by the retention capacitor 55, that is, the inter-electrode voltage of the retention capacitor 55. Thus, a current having a current value corresponding to the voltage held by the retention capacitor 55 flows between the other one of the source and drain regions and the one of the source and drain regions of the driving transistor 52. In the following description, a current flowing between the other one of the source and drain regions and the one of the source and drain regions of the driving transistor 52 is referred to as a "driving current".

When the control signal GEL(i) supplied to the control line 32 of the i-th row is at a high level, the light emission control transistor 53 is in an off state. When the light emission control transistor 53 is in an off state, the anode of the light emission element 54 is in a state of being electrically isolated from the other one of the source and drain regions of the driving transistor 52. Thus, a driving current does not flow to the light emission element 54 via the driving transistor 52. In other words, when the light emission control transistor 53 is in an off state, the light emission element 54 does not emit light.

Meanwhile, when the control signal GEL(i) is at a low level, the light emission control transistor 53 is in an on state. When the light emission control transistor 53 is in an on state, the anode of the light emission element 54 is in a state of being electrically coupled to the other one of the source and drain regions of the driving transistor 52 via the light emission control transistor 53. Thus, a driving current having a current value in accordance with the voltage held by the retention capacitor 55 flows to the light emission element 54 via the driving transistor 52. In other words, when the light emission control transistor 53 is in an on state, the light emission element 54 emits light with luminance in accordance with the driving current. Light emission luminance of the light emission element 54 varies depending on a value of the driving current, in other words, the voltage held by the retention capacitor 55.

The controller 6 controls a level inversion timing of the scanning signal GWR(i), a level inversion timing of the control signal GEL(i), the potential of the data line 33, and the like. With this, light emission luminance and light emission period of the light emission element 54 provided in each of the pixels 11 are controlled. As a result, the imaging light L indicating a predetermined image is emitted from the light emission display panel 2. The imaging light L contains visible light (colored light) emitted from the light emission element 54 provided to each of the pixels 11 of the light emission display panel 2.

Again, with reference to FIG. 2, the description is continued. The projection optical system 3 includes a plurality of optical elements such as a lens, and is an optical system that guides the imaging light L from the light emission display panel 2 to the scanning mirror 4. The projection optical system 3 magnifies and projects the imaging light L, which is emitted from the light emission display panel 2, onto the scanning mirror 4. The scanning mirror 4 reflects, toward the scanned surface 200, the imaging light L emitted from the light emission display panel 2, and perform two-dimensional scanning of the imaging light L on the scanned surface 200. The fθ lens 5 forms an image of the imaging light L, which is reflected by the scanning mirror 4, on the scanned surface 200. The scanning mirror 4 is arranged at a pupil position of the projection optical system 3. With this, the scanning mirror 4 can be reduced in size. The scanning mirror 4 is arranged at a position of an incidence pupil of the fθ lens 5.

Figure 5:
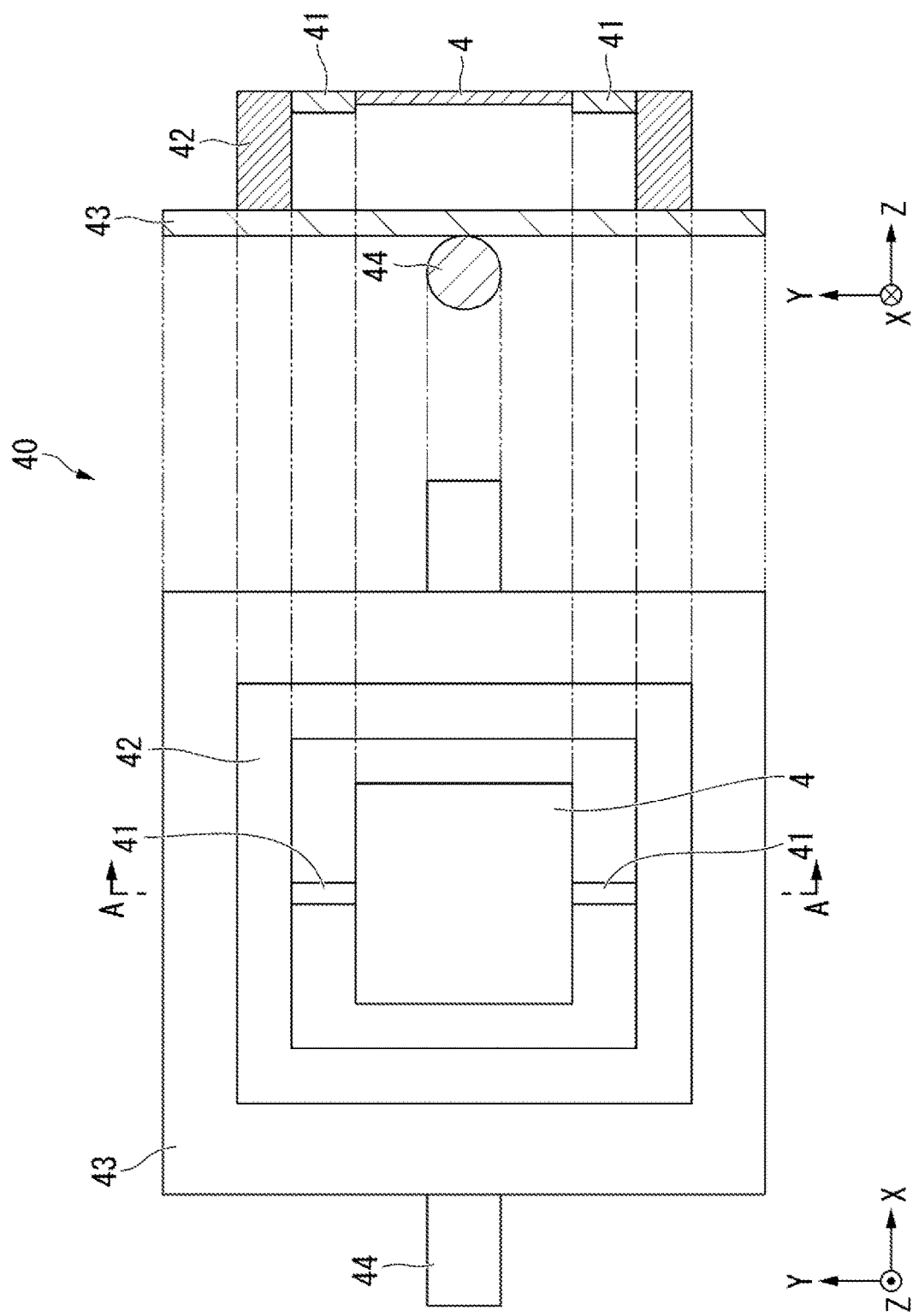
FIG. 5 is a diagram schematically illustrating one example of a mechanical structure of a MEMS scanner including a scanning mirror.

Although illustration is omitted in FIG. 1 and FIG. 2, the scanning mirror 4 in the present exemplary embodiment is a mirror of a Micro Electro Mechanical Systems (MEMS) scanner 40. FIG. 5 is a diagram schematically illustrating one example of a mechanical structure of the MEMS scanner 40 including the scanning mirror 4. In FIG. 5, the diagram on the left side is a plan view of the MEMS scanner 40, and the diagram on the right side is a cross-sectional view of the MEMS scanner 40 taken along the line A-A. In addition to the scanning mirror 4, the MEMS scanner 40 includes a pair of torsion bars 41, a mirror supporting member 42, a base plate 43, and a longitudinal scanning shaft 44.

As illustrated in FIG. 5, the scanning mirror 4 is a rectangular plate member having a surface provided with a mirror surface. The scanning mirror 4 is supported by the pair of torsion bars 41 in a rotatable manner about the Y-axis on the inner side of the mirror supporting member 42 having a frame-like shape. The mirror supporting member 42 is fixed on a front surface of the base plate 43 being a plate member having a rectangular shape, and has a predetermined height from the front surface of the base plate 43 in the Z-axis direction. In other words, the scanning mirror 4 is positioned at a predetermined height from the front surface of the base plate 43. The longitudinal scanning shaft 44 extending in the X-axis direction adheres to a back surface of the base plate 43. The base plate 43 is supported by the longitudinal scanning shaft 44 in a rotatable manner about the X-axis.

Although illustration is omitted in FIG. 5, a coil is provided along an outer periphery of the scanning mirror 4 in the MEMS scanner 40, and a magnet is provided so as to surround the scanning mirror 4. A driving current is supplied to the coil from the controller 6, and thus the scanning mirror 4 rotates about the Y-axis. In other words, the controller 6 controls a rotation angle of the scanning mirror 4 about the Y-axis.

The controller 6 controls a motor (not illustrated) that rotates the longitudinal scanning shaft 44, and thus the longitudinal scanning shaft 44 rotates. When the longitudinal scanning shaft 44 rotates, the base plate 43 rotates about the X-axis. As a result, the scanning mirror 4 also rotates about the X-axis. In other words, the controller 6 controls a rotation angle of the scanning mirror 4 about the X-axis.

Figure 6:
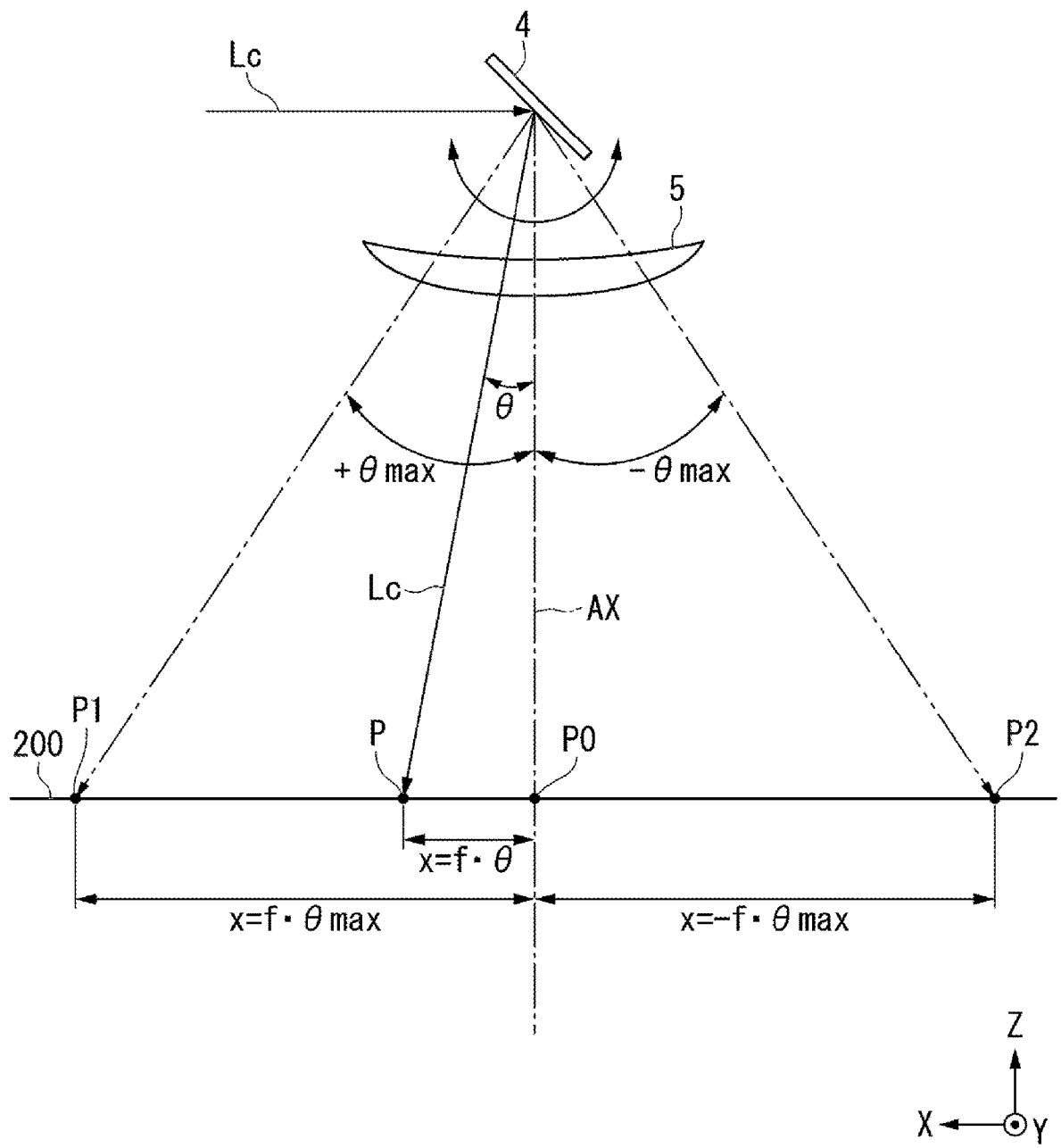
FIG. 6 is a diagram schematically illustrating a relationship between a rotation angle θ about a Y-axis of the scanning mirror and a position of a scanning point on a scanned surface.

FIG. 6 is a diagram schematically illustrating a relationship between a rotation angle θ of the scanning mirror 4 about the Y-axis and an incidence position P of a center light beam Lc on the scanned surface 200. As illustrated in FIG. 6, it is assumed that an axial line vertically connecting the center of the scanning mirror 4 and the scanned surface 200 is regarded as a reference axial line AX and that a crossing point of the reference axial line AX and the scanned surface 200 is regarded as an original point position P0. The reference axial line AX matches with an optical axis of the fθ lens 5. Among the light beams contained in the imaging light L, a light beam incident on the center of the scanning mirror 4 in parallel to the X-axis direction is regarded as the center light beam Lc.

When an inclination angle of the scanning mirror 4 with respect to the X-axis direction is 45 degrees, the center light beam Lc reflected by the scanning mirror 4 passes through the reference axial line AX, and is incident on the original point position P0. In this manner, a state in which the inclination angle of the scanning mirror 4 with respect to the X-axis direction is 45 degrees, that is, a state in which the center light beam Lc reflected by the scanning mirror 4 passes through the reference axial line AX and is incident on the original point position P0 is referred to as a "reference state".

As illustrated in FIG. 6, when the scanning mirror 4 rotates, from the above-mentioned reference state, in a clockwise direction about the Y-axis by the rotation angle θ, the center light beam Lc reflected by the scanning mirror 4 is incident on a position P away from the original point position P0 to the right side (+X side) in the X-axis direction by a distance x (=f×θ). When the scanning mirror 4 rotates, from the reference state, in a clockwise direction about the Y-axis by the maximum rotation angle θmax, the center light beam Lc reflected by the scanning mirror 4 is incident on a position P1 away from the original point position P0 to the right side (+X side) in the X-axis direction by the distance x(=f×θmax). When the scanning mirror 4 rotates, from the reference state, in a counterclockwise direction about the Y-axis by the maximum rotation angle—θmax, the center light beam Lc reflected by the scanning mirror 4 is incident on a position P2 away from the original point position P0 to the left side (−X side) in the X-axis direction by the distance x (=−f−θmax). Note that f is a focal distance of the fθ lens 5.

As described above, the distance x between the incidence position P and the original point position P0 of the center light beam Lc in the X-axis direction has a proportional relationship with the rotation angle θ of the scanning mirror 4 about the Y-axis, due to optical characteristics of the fθ lens 5. In other words, a moving velocity of the incidence position P of the center light beam Lc in the X-axis direction has a proportional relationship with a rotational velocity of the scanning mirror 4 about the Y-axis. In this manner, the incidence position P of the center light beam Lc in the X-axis direction moves in a section between the position P1 and the position P2 in accordance with a rotational motion of the scanning mirror 4 about the Y-axis.

Figure 7:
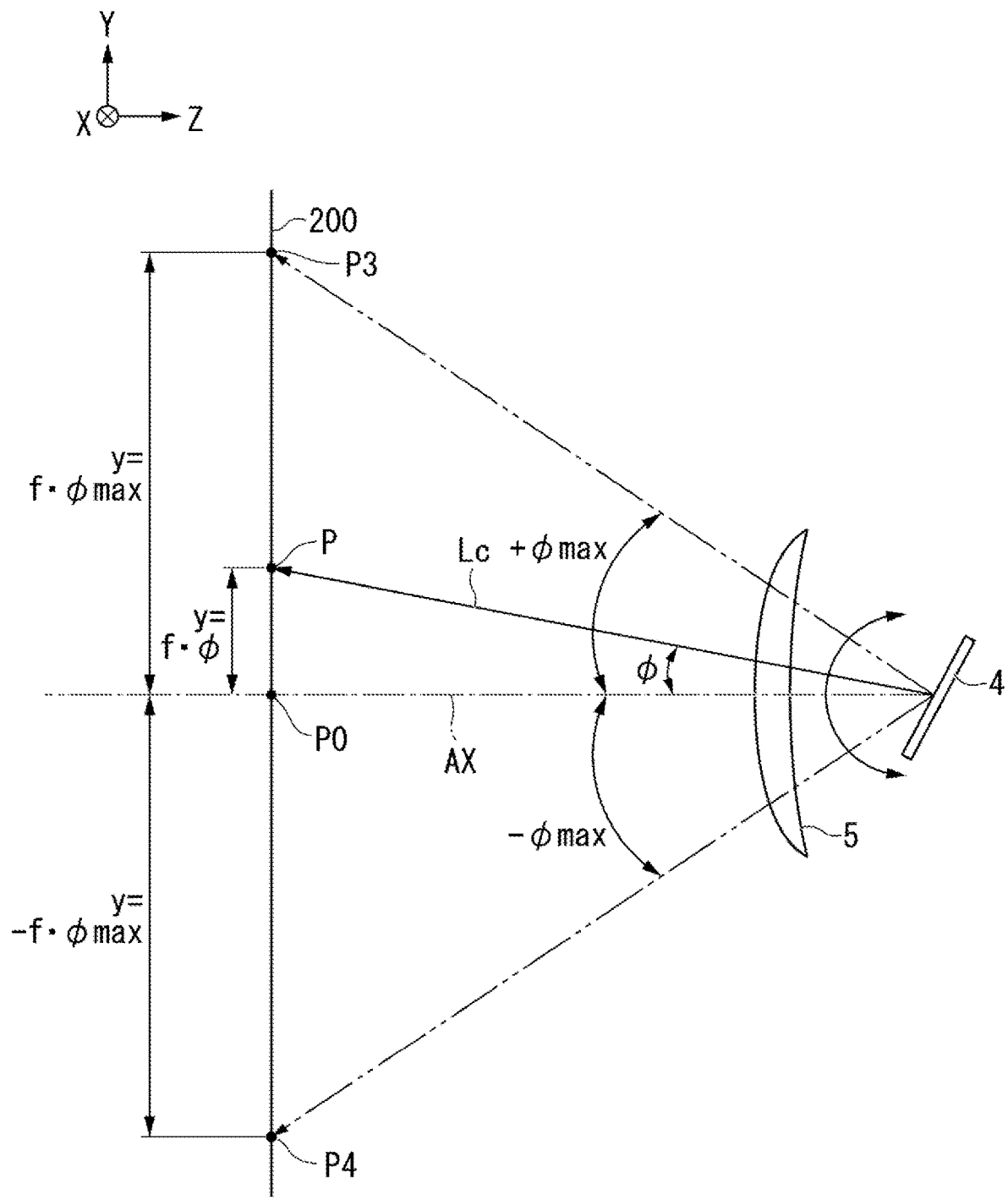
FIG. 7 is a diagram schematically illustrating a relationship between a rotation angle φ about an X-axis of the scanning mirror and the position of the scanning point on the scanned surface.

FIG. 7 is a diagram schematically illustrating a relationship between a rotation angle φ of the scanning mirror 4 about the X-axis and the incidence position P of the center light beam Lc on the scanned surface 200. As illustrated in FIG. 7, when the scanning mirror 4 rotates, from the reference state, in a clockwise direction about the X-axis by the rotation angle φ, the center light beam Lc reflected by the scanning mirror 4 is incident on the position P away from the original point position P0 to the upper side (+Y side) in the Y-axis direction by a distance y (=f×φ). When the scanning mirror 4 rotates, from the reference state, in a clockwise direction about the X-axis by the maximum rotation angle φmax, the center light beam Lc reflected by the scanning mirror 4 is incident on a position P3 away from the original point position P0 to the upper side (+Y side) in the Y-axis direction by the distance y (=f·φmax). When the scanning mirror 4 rotates, from reference state, in a counterclockwise direction about the X-axis by the maximum rotation angle—φmax, the center light beam Lc reflected by the scanning mirror 4 is incident on a position P4 away from the original point position P0 to the lower side (-Y side) in the Y-axis direction by the distance y (=-f×φmax).

As described above, the distance y between the incidence position P and the original point position P0 of the center light beam Lc in the Y-axis direction has a proportional relationship with the rotation angle φ of the scanning mirror 4 about the X axis, due to optical characteristics of the fθ lens 5. In other words, a moving velocity of the incidence position P of the center light beam Lc in the Y-axis direction has a proportional relationship with a rotational velocity of the scanning mirror 4 about the X-axis. In this manner, the incidence position P of the center light beam Lc in the Y-axis direction moves in a section between the position P3 and the position P4 in accordance with a rotational motion of the scanning mirror 4 about the X-axis.

Figure 8:
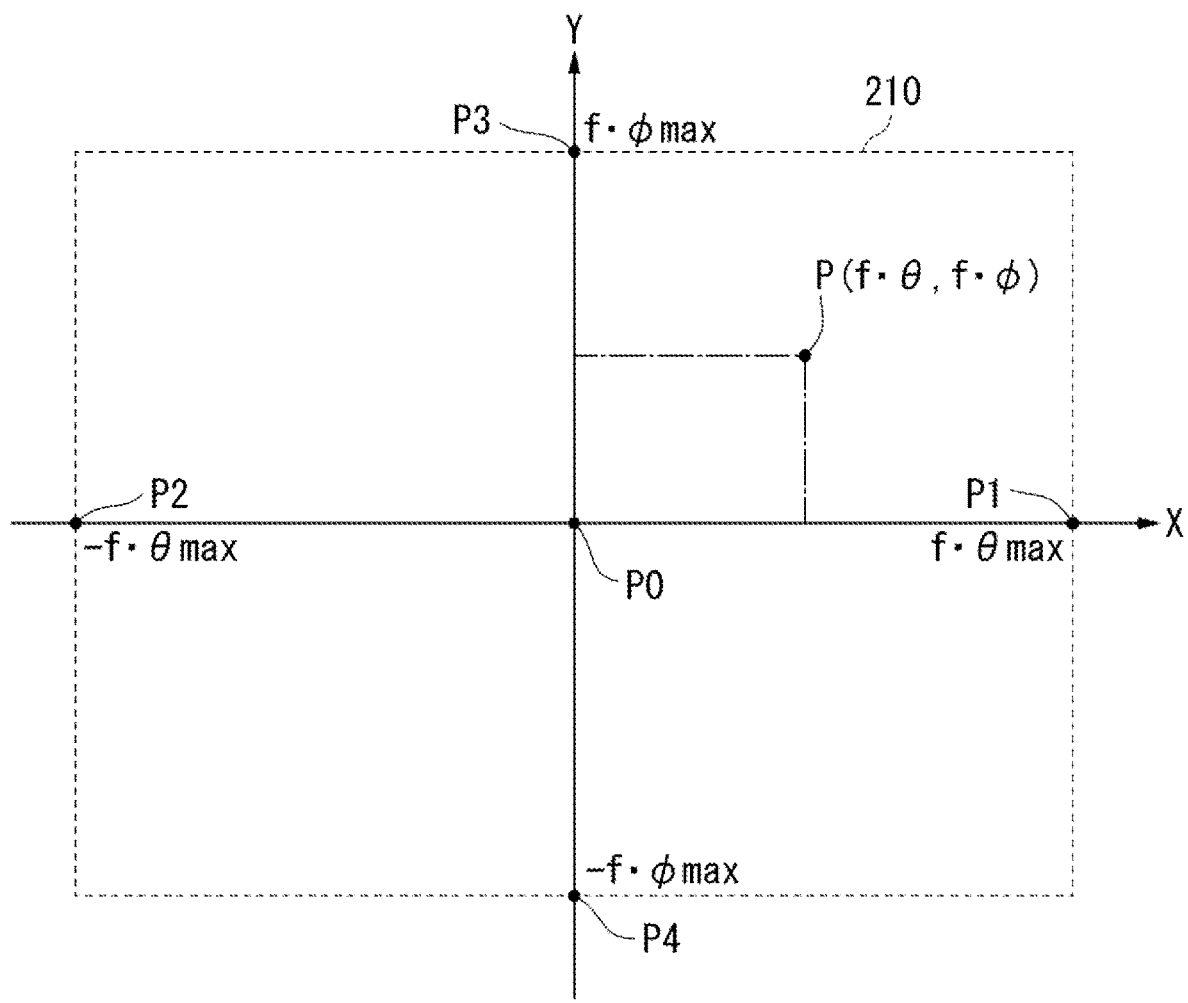
FIG. 8 is a diagram illustrating a scannable region in a surface region of the scanned surface, for which the scanning mirror can perform scanning.

To summarize the description relating to FIG. 6 and FIG. 7, as illustrated in FIG. 8, a rectangle region 210 in a surface region of the scanned surface 200 is a region for which the scanning mirror 4 can perform scanning. The rectangle region 210 has a length of 2f·θmax in the X-axis direction and a length of 2f·φmax in the Y-axis direction with the original point position P0 as a center. In the following description, the rectangle region 210 is referred to as a "scannable region". The incidence position P of the center light beam Lc moves within the scannable region 210 in accordance with a rotational motion of the scanning mirror 4 about the Y-axis and the X-axis. In the following description, as described above, the incidence position P of the center light beam Lc, which moves within the scannable region 210 in accordance with a rotational motion of the scanning mirror 4, is referred to as a "scanning point". In the following description, the rotation angle θ of the scanning mirror 4 about the Y-axis may be referred to as a "main scanning rotation angle", and the rotation angle φ of the scanning mirror 4 about the X-axis may be referred to as a "sub scanning rotation angle".

In the present exemplary embodiment, the number m of pixels of the light emission display panel 2 in the vertical direction is 200, and the number n of pixels of the light emission display panel 2 in the horizontal direction is 200. Thus, when the imaging light L emitted from the light emission display panel 2 is reflected by the scanning mirror 4 toward the scanned surface 200, the imaging light L is projected onto a region in the surface region of the scanned surface 200, which has a length corresponding to 200 pixels in the X-axis direction and a length corresponding to 200 pixels in the Y-axis direction with the scanning point P as a center (see FIG. 1). In this manner, the imaging light L is projected onto a region with the scanning point P as a center. With this, an image having a size of 200 pixels×200 pixels with the scanning point P as a center is formed on the scanned surface 200.

The controller 6 controls the light emission display panel 2 and the scanning mirror 4. Specifically, the controller 6 controls rotational motion of the scanning mirror 4 so that the scanning point P moves along a predetermined scanning route SR on the scanned surface 200, and controls the light emission display panel 2 so that the imaging light L is emitted when the scanning point P reaches each of a plurality of image display points that are set in the scanning route SR.

Figure 9:
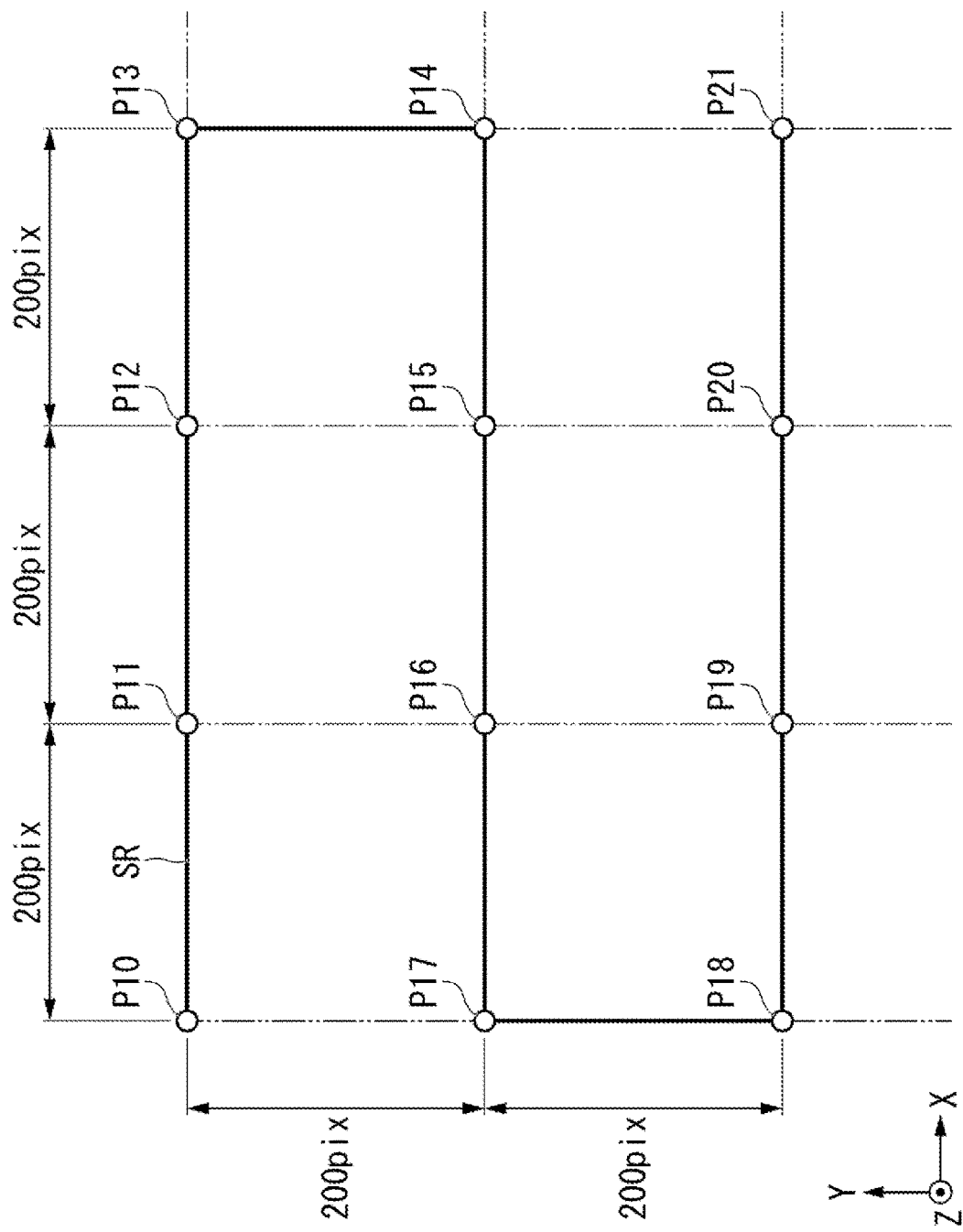
FIG. 9 is a diagram illustrating one example of a scanning route that is set in the scannable region of the scanned surface.

FIG. 9 is a diagram illustrating one example of the scanning route SR that is set in the scannable region 210 of the scanned surface 200. The scanning route SR is a route along which the scanning point P passes through image display points P10, P11, P12, P13, P14, P15, P16, P17, P18, P19, P20, and P21 in the stated order. The image display points P10, P11, P12, and P13 are arranged in the stated order in one row from the left side to the right side in the X-axis direction at an interval corresponding to 200 pixels in the X-axis direction.

The image display points P14, P15, P16, and P17 are arranged in the stated order in one row from the right side to the left side in the X-axis direction at an interval corresponding to 200 pixels in the X-axis direction. A point group including the image display points P14, P15, P16, and P17 is arranged at a position away from a point group including the image display points P10, P11, P12, and P13 to the lower side in the Y-axis direction by a distance corresponding to 200 pixels.

The image display points P18, P19, P20, and P21 are arranged in the stated order in one row from the left side to the right side in the X-axis direction at an interval corresponding to 200 pixels in the X-axis direction. A point group including the image display points P18, P19, P20, and P21 is arranged at a position away from the point group including the image display points P14, P15, P16, and P17 to the lower side in the Y-axis direction by a distance corresponding to 200 pixels.

The controller 6 controls rotational motion of the scanning mirror 4 so that the scanning point P moves along the scanning route SR, which is set as described above, at a constant velocity in a section between two adjacent image display points and stops at a reached image display point for a predetermined time period, and controls the light emission display panel 2 so that the imaging light L is emitted within the predetermined time period for which the scanning point P stops at the image display point. Moreover, the controller 6 divides an input image 100 into a plurality of subordinate images, and controls the light emission display panel 2 so that the imaging light L is emitted when the scanning point P reaches each of the plurality of image display points that are set in the scanning route SR. The imaging light L indicates a subordinate image corresponding to the reached image display point. In the following description, a mode in which the controller 6 controls the scanning mirror 4 and the light emission display panel 2 in a coordinated manner as described above is referred to as a "step scanning mode". An operation of the controller 6 in the step scanning mode is described below in detail.

Figure 10:
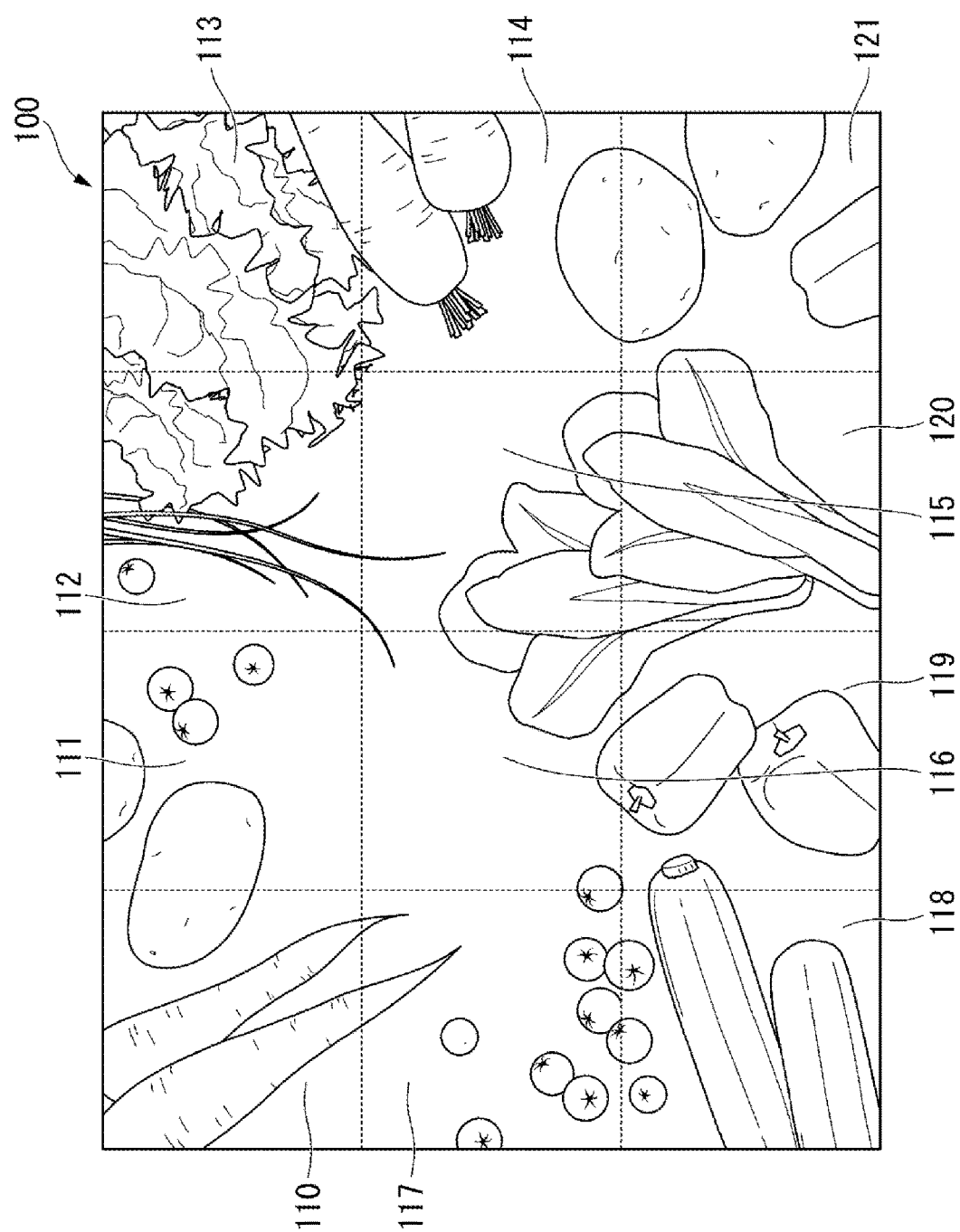
FIG. 10 is a diagram illustrating one example of an input image.

FIG. 10 is a diagram illustrating one example of the input image 100, and illustrates an image of a several kinds of vegetables. The input image 100 is an image to be displayed on the scanned surface 200 for one frame period. The controller 6 acquires the input image 100 to be displayed on the scanned surface 200 for one frame period, based on a picture image signal that is input from the outside of the projection device 1. When the input image 100 is acquired from the picture image signal, the controller 6 divides the input image 100 into twelve subordinate images 110, 111, 112, 113, 114, 115, 116, 117, 118, 119, 120, and 121, as illustrated in FIG. 10.

The subordinate image 110 is a subordinate image corresponding to the image display point P10. The subordinate image 111 is a subordinate image corresponding to the image display point P11. The subordinate image 112 is a subordinate image corresponding to the image display point P12. The subordinate image 113 is a subordinate image corresponding to the image display point P13. The subordinate image 114 is a subordinate image corresponding to the image display point P14. The subordinate image 115 is a subordinate image corresponding to the image display point P15. The subordinate image 116 is a subordinate image corresponding to the image display point P16. The subordinate image 117 is a subordinate image corresponding to the image display point P17. The subordinate image 118 is a subordinate image corresponding to the image display point P18. The subordinate image 119 is a subordinate image corresponding to the image display point P19. The subordinate image 120 is a subordinate image corresponding to the image display point P20. The subordinate image 121 is a subordinate image corresponding to the image display point P21.

The controller 6 subjects each of the subordinate images to compression processing or expansion processing as appropriate so that each of the subordinate images has a size of 200 pixels×200 pixels.

After the input image 100 is divided into the twelve subordinate images, the controller 6 feedback-controls the main scanning rotation angle θ and the sub scanning rotation angle φ of the scanning mirror 4 so that the scanning point P moves to the first image display point P10 in the scanning route SR. Further, when the scanning point P reaches the image display point P10, the controller 6 controls the scanning mirror 4 so that the scanning point P stops at the image display point P10 for a predetermined time period, and controls the light emission display panel 2 so that the imaging light L is emitted within the predetermined time period for which the scanning point P stops at the image display point P10. The imaging light L indicates the subordinate image 110 corresponding to the image display point P10.

Figure 11:
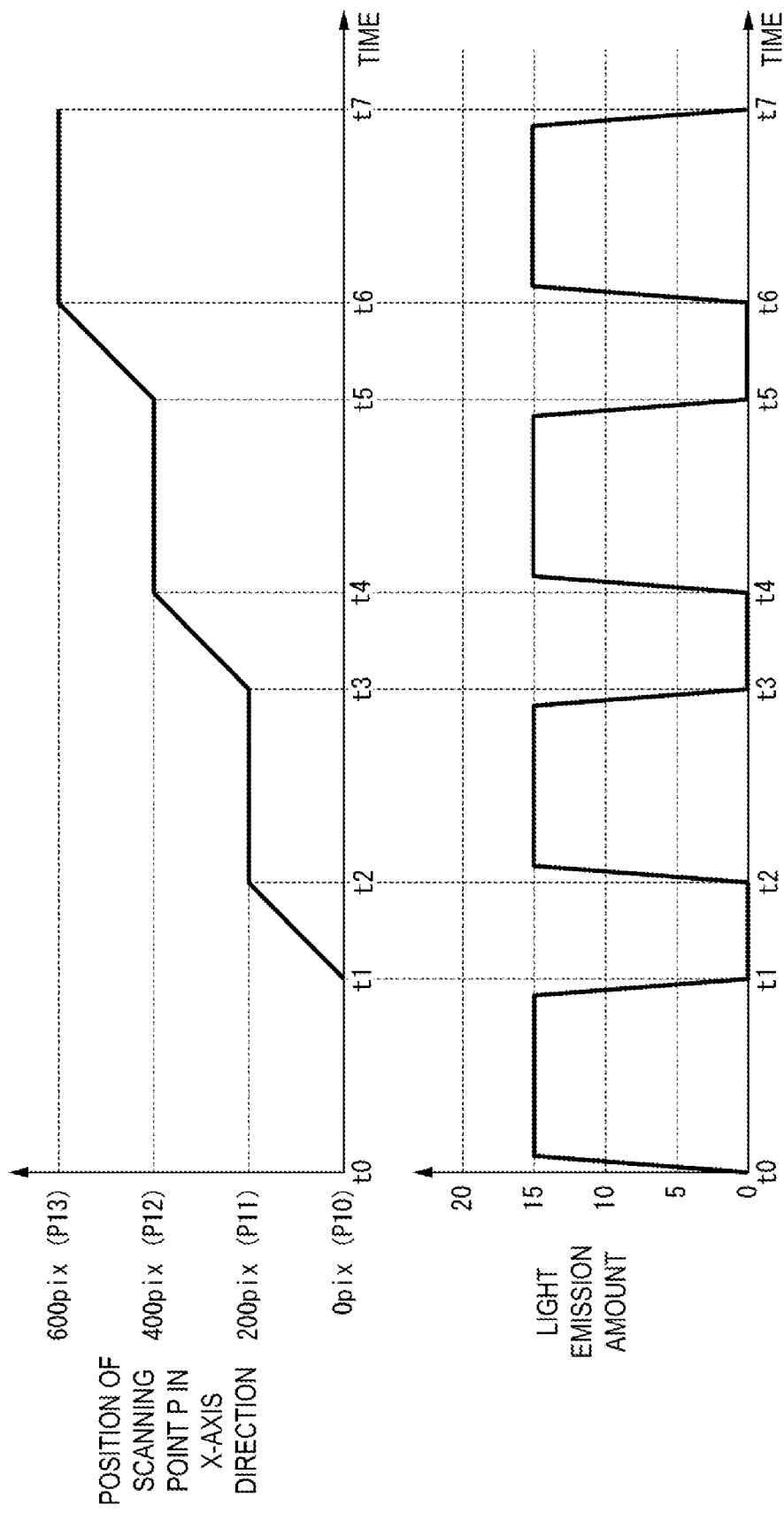
FIG. 11 is a timing chart illustrating a corresponding relationship in time between the position of the scanning point in an X direction in a step scanning mode and a light emission amount of the light emission display panel.
Figure 12:
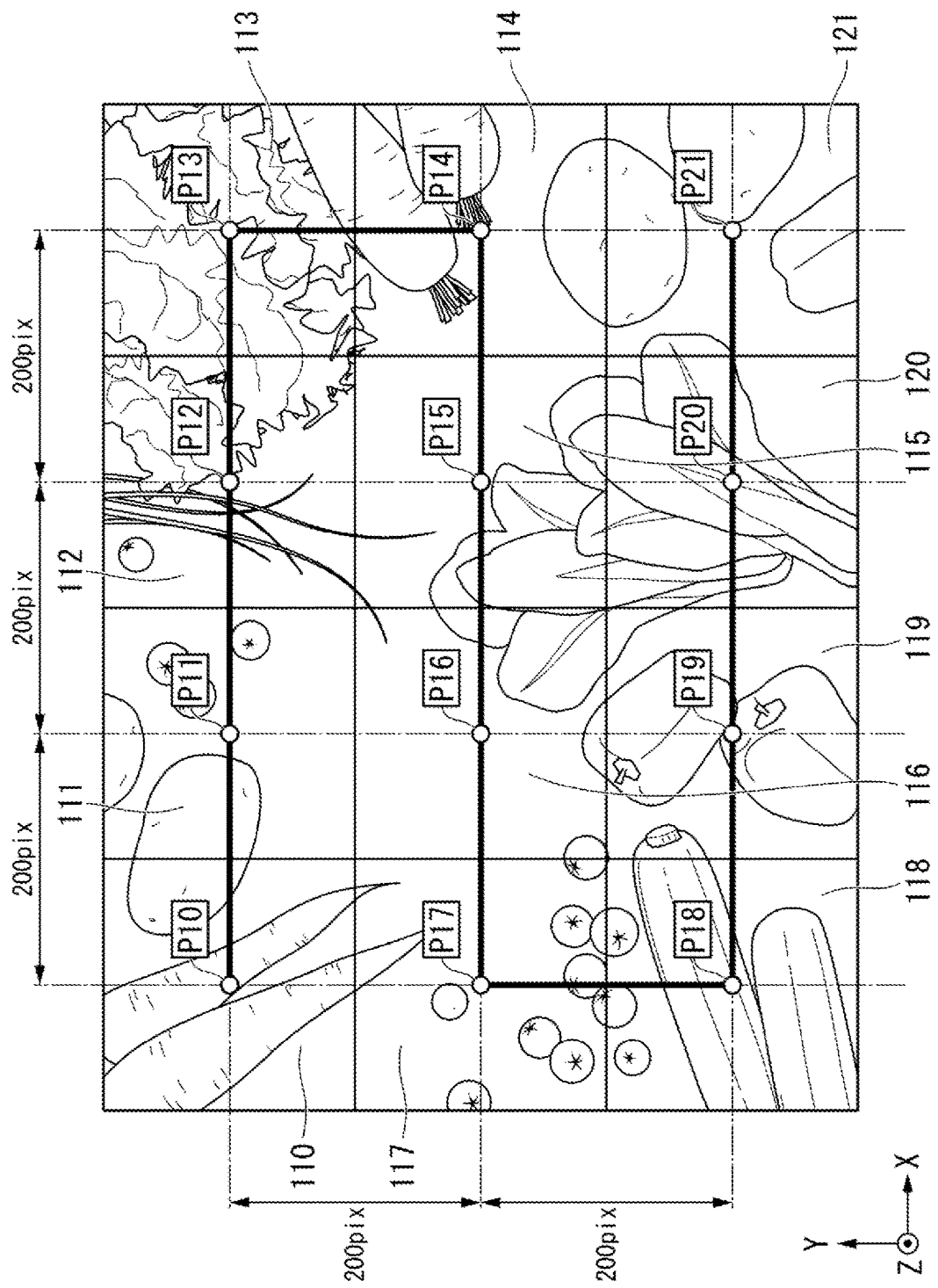
FIG. 12 is a diagram illustrating a state in which subordinate images are sequentially formed on the scanned surface while the scanning point passes through respective image display points set on the scanning route in the step scanning mode.

FIG. 11 is a timing chart illustrating a corresponding relationship in time between the position of the scanning point P in the X-axis direction in the step scanning mode and a light emission amount of the light emission display panel 2. In FIG. 11, the position of the scanning point P in the X-axis direction is indicated with the number of pixels from the image display point P10. As illustrated in FIG. 11, when the scanning point P reaches the image display point P10 at a time t0, the scanning point P stops at the image display point P10 until a time t1 arrives. A time period from the time t0 to the time t1 corresponds to the predetermined time period. Within the predetermined time period from the time t0 to the time t1, the imaging light L indicating the subordinate image 110 corresponding to the image display point P10 is emitted from the light emission display panel 2. As a result, as illustrated in FIG. 12, in the predetermined time period from the time t0 to the time t1, the subordinate image 110 having a size of 200 pixels×200 pixels with the image display point P10 as a center is formed on the scanned surface 200.

When the predetermined time period elapses under a state in which the scanning point P stops at the image display point P10, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P10 and the next image display point P11. As illustrated in FIG. 11, when the time t1 arrives after the predetermined time period elapses under a state in which the scanning point P stops at the image display point P10, the scanning point P moves at a constant high velocity from the image display point P10 to the next image display point P11 along the X-axis direction. While the scanning point P moves from the image display point P10 to the next image display point P11, a light emission amount of the light emission display panel 2 is zero.

When the scanning point P reaches the image display point P11, the controller 6 controls the scanning mirror 4 so that the scanning point P stops at the image display point P11 for a predetermined time period, and controls the light emission display panel 2 so that the imaging light L is emitted within the predetermined time period for which the scanning point P stops at the image display point P11. The imaging light L indicates the subordinate image 111 corresponding to the image display point P11.

As illustrated in FIG. 11, when the scanning point P reaches the image display point P11 at a time t2, the scanning point P stops at the image display point P11 until a time t3 arrives. A time period from the time t2 to the time t3 corresponds to the predetermined time period. Within the predetermined time period from the time t2 to the time t3, the imaging light L indicating the subordinate image 111 corresponding to the image display point P11 is emitted from the light emission display panel 2. As a result, as illustrated in FIG. 12, in the predetermined time period from the time t2 to the time t3, the subordinate image 111 having a size of 200 pixels×200 pixels with the image display point P11 as a center is formed on the scanned surface 200.

When the predetermined time period elapses under a state in which the scanning point P stops at the image display point P11, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P11 and the next image display point P12. As illustrated in FIG. 11, when the time t3 arrives after the predetermined time period elapses under a state in which the scanning point P stops at the image display point P11, the scanning point P moves at a constant high velocity from the image display point P11 to the next image display point P12 along the X-axis direction. While the scanning point P moves from the image display point P11 to the next image display point P12, a light emission amount of the light emission display panel 2 is zero.

When the scanning point P reaches the image display point P12, the controller 6 controls the scanning mirror 4 so that the scanning point P stops at the image display point P12 for a predetermined time period, and controls the light emission display panel 2 so that the imaging light L is emitted within the predetermined time period for which the scanning point P stops at the image display point P12. The imaging light L indicates the subordinate image 112 corresponding to the image display point P12.

As illustrated in FIG. 11, when the scanning point P reaches the image display point P12 at a time t4, the scanning point P stops at the image display point P12 until a time t5 arrives. A time period from the time t4 to the time t5 corresponds to the predetermined time period. Within the predetermined time period from the time t4 to the time t5, the imaging light L indicating the subordinate image 112 corresponding to the image display point P12 is emitted from the light emission display panel 2. As a result, as illustrated in FIG. 12, in the predetermined time period from the time t4 to the time t5, the subordinate image 112 having a size of 200 pixels×200 pixels with the image display point P12 as a center is formed on the scanned surface 200.

When the predetermined time period elapses under a state in which the scanning point P stops at the image display point P12, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P12 and the next image display point P13. As illustrated in FIG. 11, when the time t5 arrives after the predetermined time period elapses under a state in which the scanning point P stops at the image display point P12, the scanning point P moves at a constant high velocity from the image display point P12 to the next image display point P13 along the X-axis direction. While the scanning point P moves from the image display point P12 to the next image display point P13, a light emission amount of the light emission display panel 2 is zero.

When the scanning point P reaches the image display point P13, the controller 6 controls the scanning mirror 4 so that the scanning point P stops at the image display point P13 for a predetermined time period, and controls the light emission display panel 2 so that the imaging light L is emitted within the predetermined time period for which the scanning point P stops at the image display point P13. The imaging light L indicates the subordinate image 113 corresponding to the image display point P13.

As illustrated in FIG. 11, when the scanning point P reaches the image display point P13 at a time t6, the scanning point P stops at the image display point P13 until a time t7 arrives. A time period from the time t6 to the time t7 corresponds to the predetermined time period. Within the predetermined time period from the time t6 to the time t7, the imaging light L indicating the subordinate image 113 corresponding to the image display point P13 is emitted from the light emission display panel 2. As a result, as illustrated in FIG. 12, in the predetermined time period from the time t6 to the time t7, the subordinate image 113 having a size of 200 pixels×200 pixels with the image display point P13 as a center is formed on the scanned surface 200.

When the predetermined time period elapses under a state in which the scanning point P stops at the image display point P13, light of the light emission display panel 2 is turned off. After that, the controller 6 feedback-controls the sub scanning rotation angle φ of the scanning mirror 4 so that the scanning point P moves along the scanning route SR at a constant velocity in a section between the image display point P13 and the next image display point P14. When the scanning point P reaches the image display point P14, the controller 6 controls the scanning mirror 4 so that the scanning point P stops at the image display point P14 for a predetermined time period, and controls the light emission display panel 2 so that the imaging light L is emitted within the predetermined time period for which the scanning point P stops at the image display point P14. The imaging light L indicates the subordinate image 114 corresponding to the image display point P14. As a result, as illustrated in FIG. 12, in the predetermined time period for which the scanning point P stops at the image display point P14, the subordinate image 114 having a size of 200 pixels×200 pixels with the image display point P14 as a center is formed on the scanned surface 200.

When the predetermined time period elapses under a state in which the scanning point P stops at the image display point P14, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P14 and the next image display point P15. When the scanning point P reaches the image display point P15, the controller 6 controls the scanning mirror 4 so that the scanning point P stops at the image display point P15 for a predetermined time period, and controls the light emission display panel 2 so that the imaging light L is emitted within the predetermined time period for which the scanning point P stops at the image display point P15. The imaging light L indicates the subordinate image 115 corresponding to the image display point P15. As a result, as illustrated in FIG. 12, in the predetermined time period for which the scanning point P stops at the image display point P15, the subordinate image 115 having a size of 200 pixels×200 pixels with the image display point P15 as a center is formed on the scanned surface 200.

When the predetermined time period elapses under a state in which the scanning point P stops at the image display point P15, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P15 and the next image display point P16. When the scanning point P reaches the image display point P16, the controller 6 controls the scanning mirror 4 so that the scanning point P stops at the image display point P16 for a predetermined time period, and controls the light emission display panel 2 so that the imaging light L is emitted within the predetermined time period for which the scanning point P stops at the image display point P16. The imaging light L indicates the subordinate image 116 corresponding to the image display point P16. As a result, as illustrated in FIG. 12, in the predetermined time period for which the scanning point P stops at the image display point P16, the subordinate image 116 having a size of 200 pixels×200 pixels with the image display point P16 as a center is formed on the scanned surface 200.

When the predetermined time period elapses under a state in which the scanning point P stops at the image display point P16, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P16 and the next image display point P17. When the scanning point P reaches the image display point P17, the controller 6 controls the scanning mirror 4 so that the scanning point P stops at the image display point P17 for a predetermined time period, and controls the light emission display panel 2 so that the imaging light L is emitted within the predetermined time period for which the scanning point P stops at the image display point P17. The imaging light L indicates the subordinate image 117 corresponding to the image display point P17. As a result, as illustrated in FIG. 12, in the predetermined time period for which the scanning point P stops at the image display point P17, the subordinate image 117 having a size of 200 pixels×200 pixels with the image display point P17 as a center is formed on the scanned surface 200.

When the predetermined time period elapses under a state in which the scanning point P stops at the image display point P17, light of the light emission display panel 2 is turned off. After that, the controller 6 feedback-controls the sub scanning rotation angle φ of the scanning mirror 4 so that the scanning point P moves along the scanning route SR at a constant velocity in a section between the image display point P17 and the next image display point P18. When the scanning point P reaches the image display point P18, the controller 6 controls the scanning mirror 4 so that the scanning point P stops at the image display point P18 for a predetermined time period, and controls the light emission display panel 2 so that the imaging light L is emitted within the predetermined time period for which the scanning point P stops at the image display point P18. The imaging light L indicates the subordinate image 118 corresponding to the image display point P18. As a result, as illustrated in FIG. 12, in the predetermined time period for which the scanning point P stops at the image display point P18, the subordinate image 118 having a size of 200 pixels×200 pixels with the image display point P18 as a center is formed on the scanned surface 200.

When the predetermined time period elapses under a state in which the scanning point P stops at the image display point P18, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P18 and the next image display point P19. When the scanning point P reaches the image display point P19, the controller 6 controls the scanning mirror 4 so that the scanning point P stops at the image display point P19 for a predetermined time period, and controls the light emission display panel 2 so that the imaging light L is emitted within the predetermined time period for which the scanning point P stops at the image display point P19. The imaging light L indicates the subordinate image 119 corresponding to the image display point P19. As a result, as illustrated in FIG. 12, in the predetermined time period for which the scanning point P stops at the image display point P19, the subordinate image 119 having a size of 200 pixels×200 pixels with the image display point P19 as a center is formed on the scanned surface 200.

When the predetermined time period elapses under a state in which the scanning point P stops at the image display point P19, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P19 and the next image display point P20. When the scanning point P reaches the image display point P20, the controller 6 controls the scanning mirror 4 so that the scanning point P stops at the image display point P20 for a predetermined time period, and controls the light emission display panel 2 so that the imaging light L is emitted within the predetermined time period for which the scanning point P stops at the image display point P20. The imaging light L indicates the subordinate image 120 corresponding to the image display point P20. As a result, as illustrated in FIG. 12, in the predetermined time period for which the scanning point P stops at the image display point P20, the subordinate image 120 having a size of 200 pixels×200 pixels with the image display point P20 as a center is formed on the scanned surface 200.

When the predetermined time period elapses under a state in which the scanning point P stops at the image display point P20, light of the light emission display panel 2 is turned off. After that, the controller 6 feedback-controls the main scanning rotation angle θ of the scanning mirror 4 so that the scanning point P moves along the scanning route SR at a constant velocity in a section between the image display point P20 and the next image display point P21. When the scanning point P reaches the image display point P21, the controller 6 controls the scanning mirror 4 so that the scanning point P stops at the image display point P21 for a predetermined time period, and controls the light emission display panel 2 so that the imaging light L is emitted within the predetermined time period for which the scanning point P stops at the image display point P21. The imaging light L indicates the subordinate image 121 corresponding to the image display point P21. As a result, as illustrated in FIG. 12, in the predetermined time period for which the scanning point P stops at the image display point P21, the subordinate image 121 having a size of 200 pixels×200 pixels with the image display point P21 as a center is formed on the scanned surface 200.

As described above, the above-mentioned operation is executed every time the scanning point P reaches each of the twelve image display points that are set in the scanning route SR. With this, an image to be visually recognized by a user as the same image as the input image 100 is finally displayed on the scanned surface 200. Note that the series of operations described above are executed within one frame period.

Figure 13:
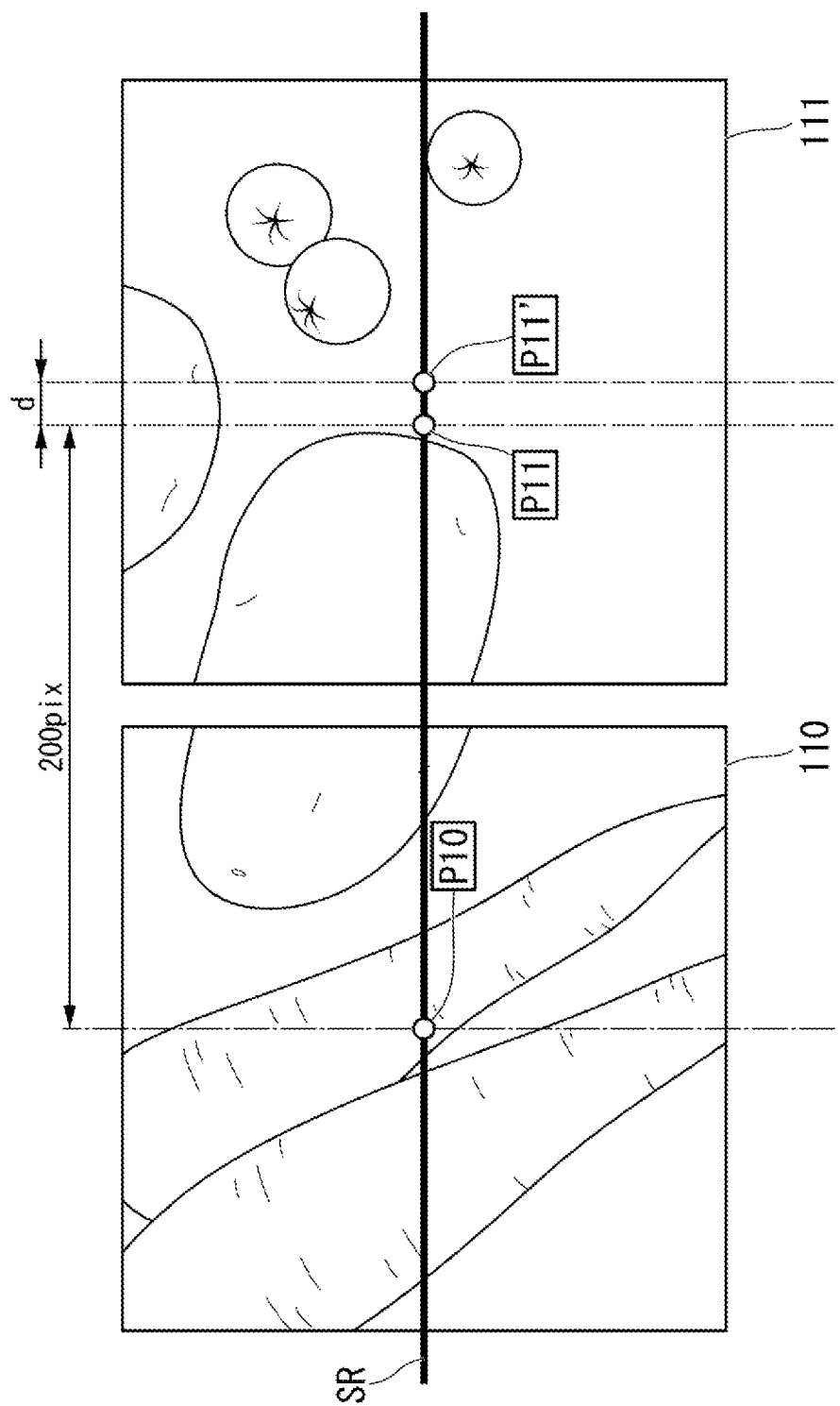
FIG. 13 is a first explanatory diagram relating to an overlap region provided to subordinate images.

As illustrated in FIG. 13, for example, due to accuracy of the feedback control of the scanning mirror 4, the center of the subordinate image 111 adjacent to the right side of the subordinate image 110 may be at a point P11' that is deviated rightward by a distance d from the image display point P11 set in the scanning route SR. In this case, a gap having a width d is formed between the subordinate image 110 and the subordinate image 111 that are adjacent to each other. In this manner, a gap formed between a pair of adjacent subordinate images may be visually recognized by a user, as an image defect such as a bright line and a dark line.

Figure 14:
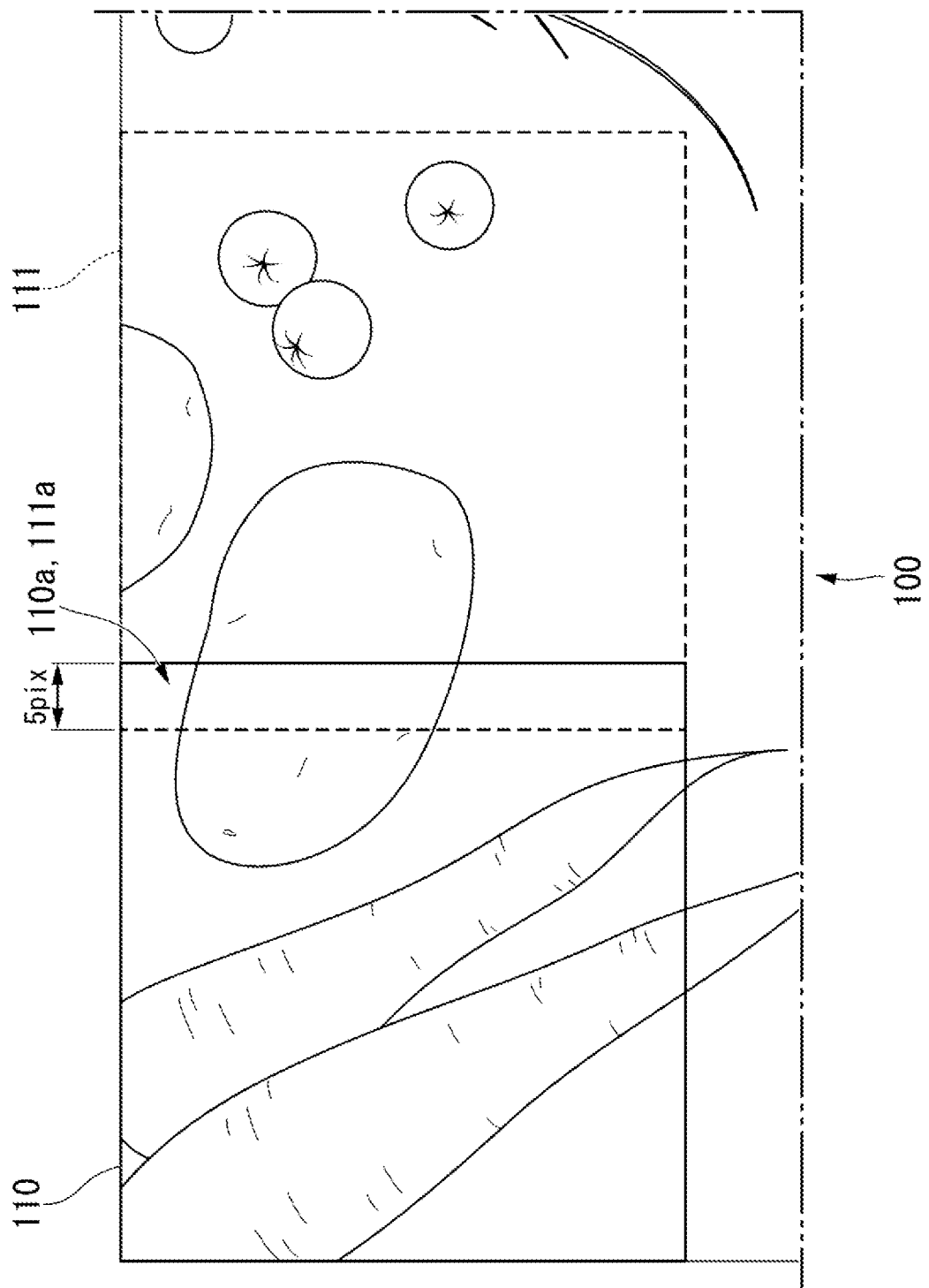
FIG. 14 is a second explanatory diagram relating to an overlap region provided to subordinate images.

In view of this, when the input image 100 is divided into a plurality of subordinate images, the controller 6 divides the input image 100 so that a pair of adjacent subordinate images among the plurality of subordinate images have an overlap region in which the pair of adjacent subordinate images overlap with each other. As illustrated in FIG. 14, for example, the adjacent subordinate images 110 and 111 that form a pair are taken as an example. The input image 100 is divided so that the subordinate image 110 has an overlap region 110a and the subordinate image 111 has an overlap region 111a. The widths of the overlap regions 110a and 111a may be set to a value equal to a maximum value of the deviation amount d of the image display point. For example, when the maximum value of the deviation amount d of the image display point is a length corresponding to five pixels, the widths of the overlap regions 110a and 111a are also set to a length corresponding to five pixels (see FIG. 14).

Figure 15:
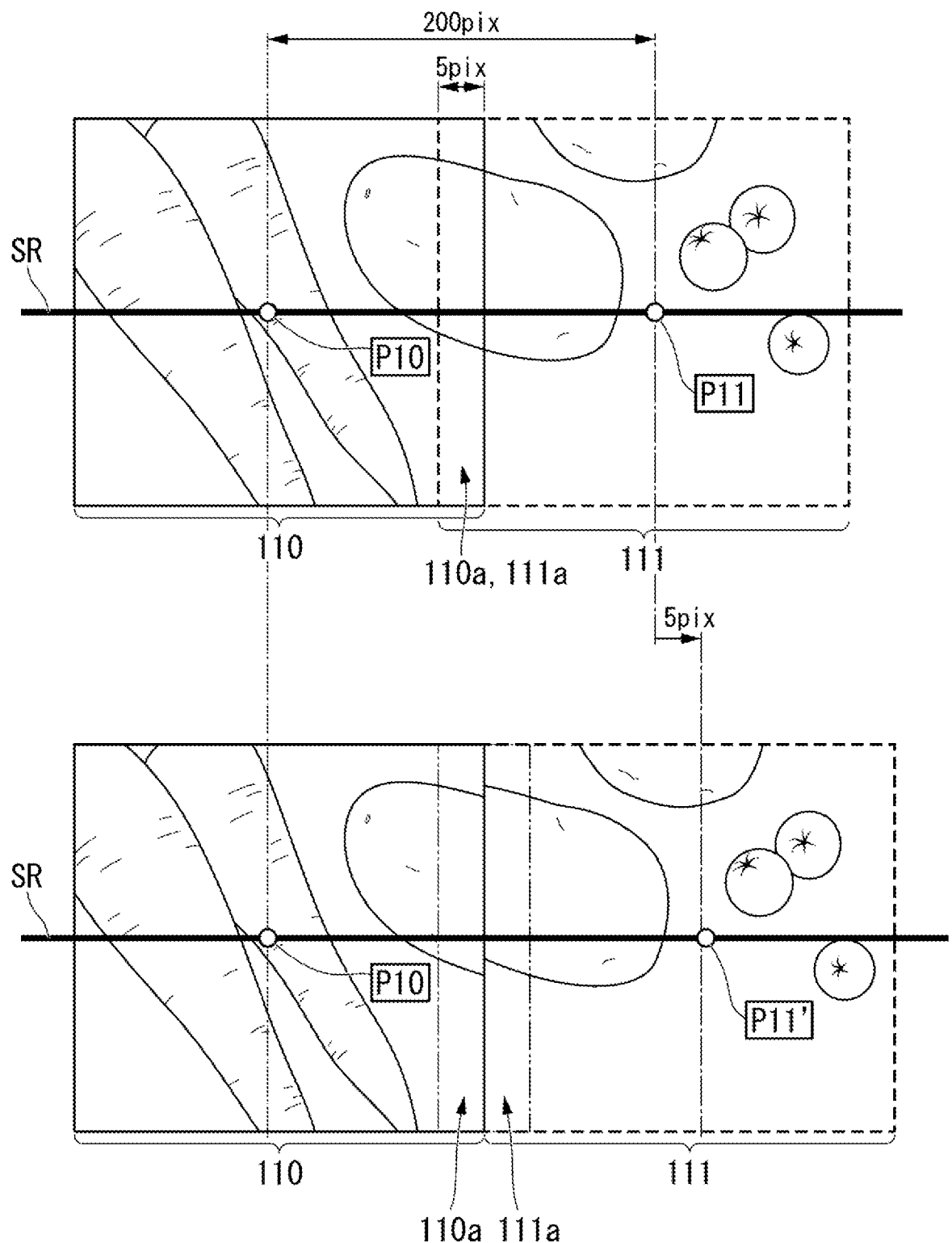
FIG. 15 is a third explanatory diagram relating to an overlap region provided to subordinate images.

As illustrated in the upper diagram of FIG. 15, when, on the scanned surface 200, the center of the subordinate image 111 adjacent to the right side of the subordinate image 110 matches the image display point P11 set in the scanning route SR, the overlap region 110a of the subordinate image 110 and the overlap region 111a of the subordinate image 111 completely overlap with each other. In this case, the subordinate image 110 and the subordinate image 111 have a smooth boundary therebetween without image deviation, and are visually recognized by a user as an image equivalent to the input image 100.

Meanwhile, as illustrated in the lower diagram of FIG. 15, even when the center of the subordinate image 111 adjacent to the right side of the subordinate image 110 is at the point P11' that is deviated to rightward by five pixels from the image display point P11, which is set in the scanning route SR, a gap is not formed between the subordinate image 110 and the subordinate image 111. In this case, image deviation is caused near the boundary between the overlap region 110a of the subordinate image 110 and the overlap region 111a of the subordinate image 111, but is not as much as visually recognized by a user.

In this manner, the pair of adjacent subordinate images among the plurality of subordinate images have the overlap region in which the pair of adjacent subordinate images overlap with each other. With this, formation of a gap between the pair of adjacent subordinate images can be prevented.

Figure 16:
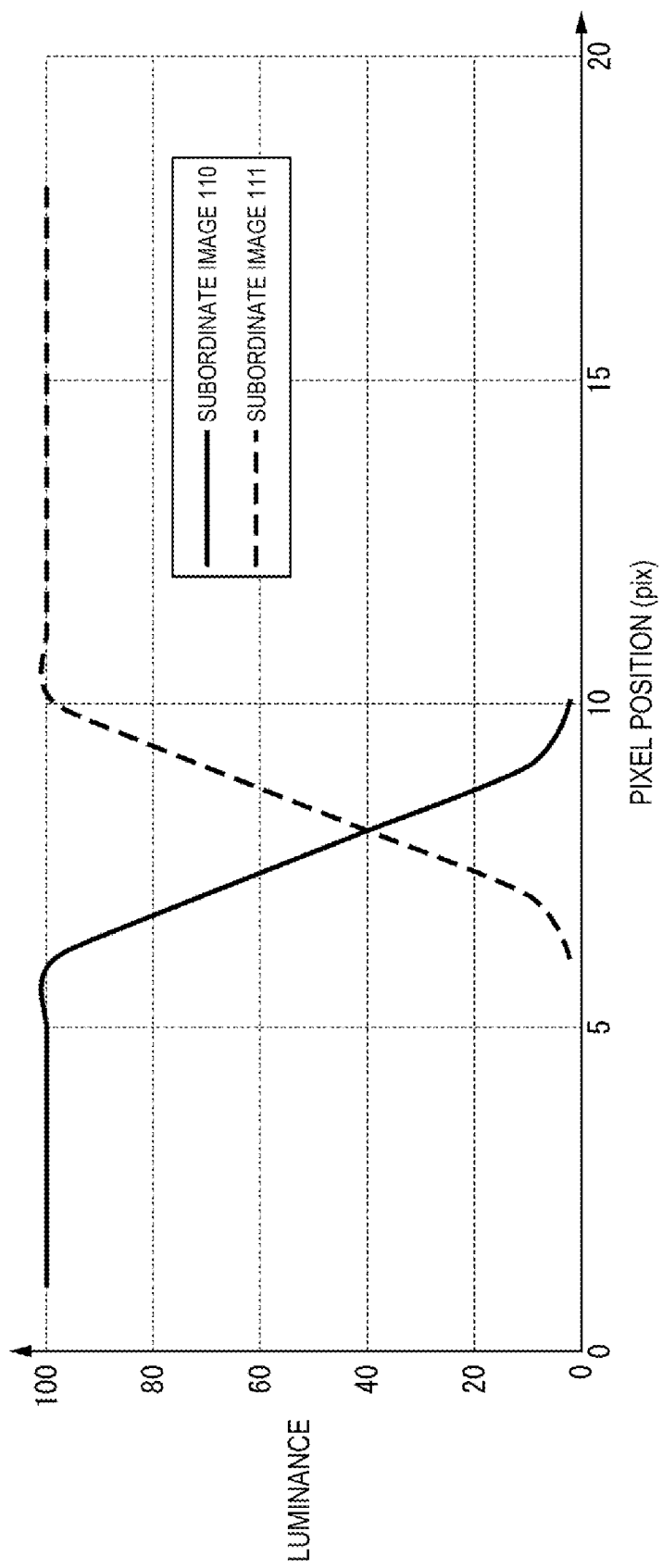
FIG. 16 is a fourth explanatory diagram relating to an overlap region provided to subordinate images.

When the overlap region 110a of the subordinate image 110 and the overlap region 111a of the subordinate image 111 overlap partially or entirely with each other, luminance of the overlapping part is doubled. Such a partial luminance increase may be visually recognized by a user as luminance fluctuation. In view of this, in the present exemplary embodiment, as illustrated in FIG. 16, luminance of the subordinate image 110 is set so that, in the subordinate image 110, luminance is gradually reduced from a boundary between the overlap region 110a and another region to an edge of the overlap region 110a. Similarly, luminance of the subordinate image 111 is set so that, in the subordinate image 111, luminance is gradually reduced from a boundary between the overlap region 111a and another region to an edge of the overlap region 111a. With this, even when the overlap region 110a of the subordinate image 110 and the overlap region 111a of the subordinate image 111 overlap partially or entirely with each other, luminance of the overlapping part is equalized. Thus, the overlapping part can be prevented from being visually recognized by a user as luminance fluctuation.

Note that, although the above-mentioned overlap region is described focusing on the subordinate image 110 and the subordinate image 111 that are adjacent to each other in the lateral direction, overlap regions may be provided to all the pairs of adjacent subordinate images, as a matter of course. For example, the subordinate image 110 and the subordinate image 117 that are adjacent to each other in the longitudinal direction may also be provided with an overlap region in which the subordinate image 110 and the subordinate image 117 overlap with each other. For example, the subordinate image 116 may be provided with overlap regions with respect to the subordinate images 111, 115, 117, and 119 that are adjacent to the upper side, the right side, the left side, and the lower side of the subordinate image 116, respectively.

In addition to the step scanning mode described above, the controller 6 is capable of controlling the scanning mirror 4 and the light emission display panel 2 in a coordinated manner in a normal scanning mode. In the normal scanning mode, the controller 6 controls rotational motion of the scanning mirror 4 so that the scanning point P moves along the scanning route SR at a constant velocity, and controls the light emission display panel 2 so that the imaging light L is emitted when the scanning point P reaches each of the plurality of image display points that are set in the scanning route SR. The imaging light L indicates a subordinate image corresponding to the image display point. An operation of the controller 6 in the normal scanning mode is described below in detail.

Figure 17:
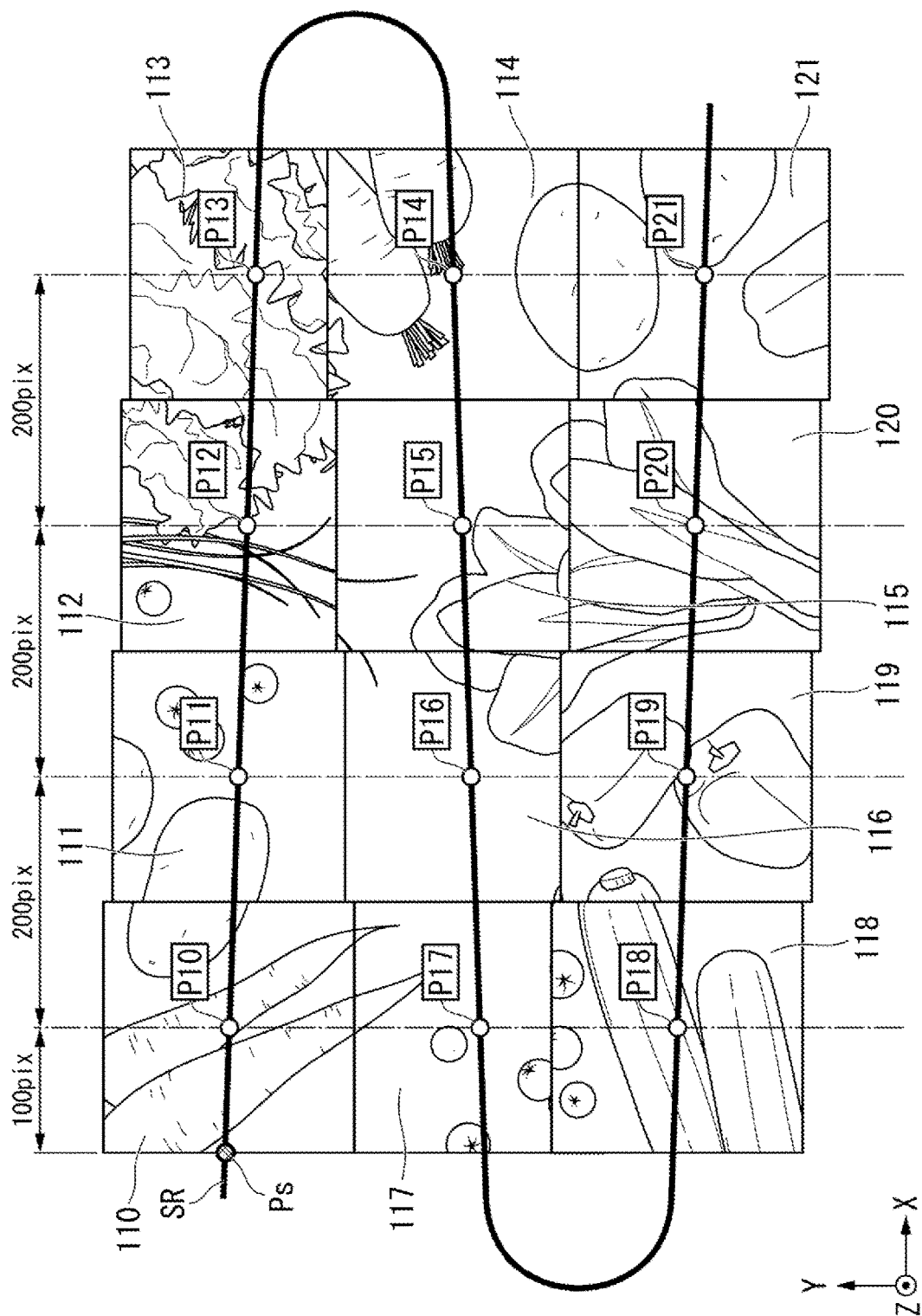
FIG. 17 is a diagram illustrating a state in which subordinate images are sequentially formed on the scanned surface while the scanning point passes through respective image display points set on the scanning route in a normal scanning mode.

As illustrated in FIG. 17, the scanning route SR in the normal scanning mode is a route along which the scanning point P passes through the image display points P10, P11, P12, P13, P14, P15, P16, P17, P18, P19, P20, and P21 in the stated order. The scanning route SR in the normal scanning mode has a sine wave-like zig-zag form, which is different from the scanning route SR in the step scanning mode. Thus, as the scanning point P advances along the scanning route SR, the position of the image display point is gradually lowered.

When the input image 100 is acquired from the picture image signal, the controller 6 divides the input image 100 into the twelve subordinate images 110, 111, 112, 113, 114, 115, 116, 117, 118, 119, 120, and 121. As illustrated in FIG. 17, after the input image 100 is divided into the twelve subordinate images, the controller 6 feedback-controls the main scanning rotation angle θ and the sub scanning rotation angle φ of the scanning mirror 4 so that the scanning point P moves to a starting point Ps in the scanning route SR. After the scanning point P reaches the starting point, the controller 6 rotates scanning mirror 4 at a constant velocity so that the scanning point P moves along the scanning route SR at a constant velocity.

Further, when the scanning point P reaches the image display point P10, the controller 6 controls the light emission display panel 2 so that the imaging light L indicating the subordinate image 110 corresponding to the image display point P10 is emitted. With this, at a timing when the scanning point P reaches the image display point P10, the imaging light L indicating the subordinate image 110 corresponding to the image display point P10 is instantaneously emitted from the light emission display panel 2. As a result, as illustrated in FIG. 17, the subordinate image 110 having a size of 200 pixels×200 pixels with the image display point P10 as a center is formed on the scanned surface 200 for an extremely short time period.

Subsequently, when the scanning point P reaches the image display point P11, the controller 6 controls the light emission display panel 2 so that the imaging light L indicating the subordinate image 111 corresponding to the image display point P11 is emitted. With this, at a timing when the scanning point P reaches the image display point P11, the imaging light L indicating the subordinate image 111 corresponding to the image display point P11 is instantaneously emitted from the light emission display panel 2. As a result, as illustrated in FIG. 17, the subordinate image 111 having a size of 200 pixels×200 pixels with the image display point P11 as a center is formed on the scanned surface 200 for an extremely short time period.

Subsequently, when the scanning point P reaches the image display point P12, the controller 6 controls the light emission display panel 2 so that the imaging light L indicating the subordinate image 112 corresponding to the image display point P12 is emitted. With this, at a timing when the scanning point P reaches the image display point P12, the imaging light L indicating the subordinate image 112 corresponding to the image display point P12 is instantaneously emitted from the light emission display panel 2. As a result, as illustrated in FIG. 17, the subordinate image 112 having a size of 200 pixels×200 pixels with the image display point P12 as a center is formed on the scanned surface 200 for an extremely short time period.

Subsequently, when the scanning point P reaches the image display point P13, the controller 6 controls the light emission display panel 2 so that the imaging light L indicating the subordinate image 113 corresponding to the image display point P13 is emitted. With this, at a timing when the scanning point P reaches the image display point P13, the imaging light L indicating the subordinate image 113 corresponding to the image display point P13 is instantaneously emitted from the light emission display panel 2. As a result, as illustrated in FIG. 17, the subordinate image 113 having a size of 200 pixels×200 pixels with the image display point P13 as a center is formed on the scanned surface 200 for an extremely short time period.

Subsequently, when the scanning point P reaches the image display point P14, the controller 6 controls the light emission display panel 2 so that the imaging light L indicating the subordinate image 114 corresponding to the image display point P14 is emitted. With this, at a timing when the scanning point P reaches the image display point P14, the imaging light L indicating the subordinate image 114 corresponding to the image display point P14 is instantaneously emitted from the light emission display panel 2. As a result, as illustrated in FIG. 17, the subordinate image 114 having a size of 200 pixels×200 pixels with the image display point P14 as a center is formed on the scanned surface 200 for an extremely short time period.

Subsequently, when the scanning point P reaches the image display point P15, the controller 6 controls the light emission display panel 2 so that the imaging light L indicating the subordinate image 115 corresponding to the image display point P15 is emitted. With this, at a timing when the scanning point P reaches the image display point P15, the imaging light L indicating the subordinate image 115 corresponding to the image display point P15 is instantaneously emitted from the light emission display panel 2. As a result, as illustrated in FIG. 17, the subordinate image 115 having a size of 200 pixels×200 pixels with the image display point P15 as a center is formed on the scanned surface 200 for an extremely short time period.

Subsequently, when the scanning point P reaches the image display point P16, the controller 6 controls the light emission display panel 2 so that the imaging light L indicating the subordinate image 116 corresponding to the image display point P16 is emitted. With this, at a timing when the scanning point P reaches the image display point P16, the imaging light L indicating the subordinate image 116 corresponding to the image display point P16 is instantaneously emitted from the light emission display panel 2. As a result, as illustrated in FIG. 17, the subordinate image 116 having a size of 200 pixels×200 pixels with the image display point P16 as a center is formed on the scanned surface 200 for an extremely short time period.

Subsequently, when the scanning point P reaches the image display point P17, the controller 6 controls the light emission display panel 2 so that the imaging light L indicating the subordinate image 117 corresponding to the image display point P17 is emitted. With this, at a timing when the scanning point P reaches the image display point P17, the imaging light L indicating the subordinate image 117 corresponding to the image display point P17 is instantaneously emitted from the light emission display panel 2. As a result, as illustrated in FIG. 17, the subordinate image 117 having a size of 200 pixels×200 pixels with the image display point P17 as a center is formed on the scanned surface 200 for an extremely short time period.

Subsequently, when the scanning point P reaches the image display point P18, the controller 6 controls the light emission display panel 2 so that the imaging light L indicating the subordinate image 118 corresponding to the image display point P18 is emitted. With this, at a timing when the scanning point P reaches the image display point P18, the imaging light L indicating the subordinate image 118 corresponding to the image display point P18 is instantaneously emitted from the light emission display panel 2. As a result, as illustrated in FIG. 17, the subordinate image 118 having a size of 200 pixels×200 pixels with the image display point P18 as a center is formed on the scanned surface 200 for an extremely short time period.

Subsequently, when the scanning point P reaches the image display point P19, the controller 6 controls the light emission display panel 2 so that the imaging light L indicating the subordinate image 119 corresponding to the image display point P19 is emitted. With this, at a timing when the scanning point P reaches the image display point P19, the imaging light L indicating the subordinate image 119 corresponding to the image display point P19 is instantaneously emitted from the light emission display panel 2. As a result, as illustrated in FIG. 17, the subordinate image 119 having a size of 200 pixels×200 pixels with the image display point P19 as a center is formed on the scanned surface 200 for an extremely short time period.

Subsequently, when the scanning point P reaches the image display point P20, the controller 6 controls the light emission display panel 2 so that the imaging light L indicating the subordinate image 120 corresponding to the image display point P20 is emitted. With this, at a timing when the scanning point P reaches the image display point P20, the imaging light L indicating the subordinate image 120 corresponding to the image display point P20 is instantaneously emitted from the light emission display panel 2. As a result, as illustrated in FIG. 17, the subordinate image 120 having a size of 200 pixels×200 pixels with the image display point P20 as a center is formed on the scanned surface 200 for an extremely short time period.

Finally, when the scanning point P reaches the image display point P21, the controller 6 controls the light emission display panel 2 so that the imaging light L indicating the subordinate image 121 corresponding to the image display point P21 is emitted. With this, at a timing when the scanning point P reaches the image display point P21, the imaging light L indicating the subordinate image 121 corresponding to the image display point P21 is instantaneously emitted from the light emission display panel 2. As a result, as illustrated in FIG. 17, the subordinate image 121 having a size of 200 pixels×200 pixels with the image display point P21 as a center is formed on the scanned surface 200 for an extremely short time period.

As described above, the above-mentioned operation is executed every time the scanning point P reaches each of the twelve image display points that are set in the scanning route SR. With this, an image to be visually recognized by a user is finally displayed on the scanned surface 200. However, as illustrated in FIG. 17, in the normal scanning mode, the position of the image display point is gradually lowered as the scanning point P advances along the scanning route SR. Thus, as the scanning point P advances along the scanning route SR, the subordinate image formed at each of the image display points is also gradually lowered. Thus, the image that is finally displayed on the scanned surface 200 may be visually recognized by a user as an image different from the input image 100. Therefore, in the normal scanning mode, each of the subordinate images is subjected to image processing in consideration of the above-mentioned image deviation. Note that, in the normal scanning mode, each of the subordinate images is also provided with an overlap region.

Figure 18:
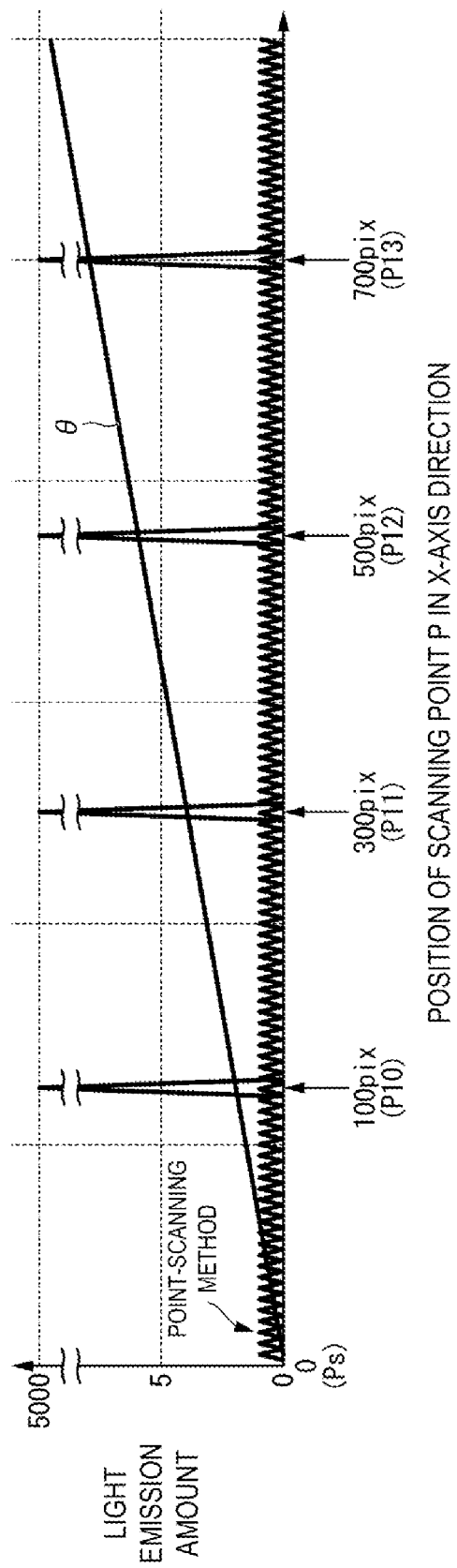
FIG. 18 is a timing chart illustrating a corresponding relationship in time between the position of the scanning point in the X direction in the normal scanning mode, a main scanning rotation angle θ of a scanning mirror 4, and the light emission amount of the light emission display panel.

FIG. 18 is a diagram illustrating a corresponding relationship between the position of the scanning point P in the X direction in the normal scanning mode, the main scanning rotation angle θ of the scanning mirror 4, and a light emission amount of the light emission display panel 2. In FIG. 18, the position of the scanning point P in a section from a starting point Ps to the image display point P13 is indicated with the number of pixels from the starting point Ps. As illustrated in FIG. 18, in the normal scanning mode, when the scanning point P reaches each of the image display points P10, P11, P12, and P13, light of the light emission display panel 2 is required to be turned on instantaneously with an extremely high light emission amount. In the normal scanning mode, light of the light emission display panel 2 is required to be turned on with a light emission amount that is several hundred times as much as that in the step scanning mode (see FIG. 11). In the normal scanning mode, as compared to a case in which an image is displayed in a related-art point-scanning method, light of the light emission display panel 2 is required to be turned on with a light emission amount that is approximately pixel-number times (see FIG. 18). Thus, in the normal scanning mode, it is required to drive the light emission display panel 2 at a high speed, and the light emission element 54 having high output is required.

As described above, in the projection device 1 according to the present exemplary embodiment, the imaging light L that includes the number of pixels of 200 pixels×200 pixels and is emitted from the light emission display panel 2 is reflected by the scanning mirror 4 onto the scanned surface 200, and scanning is performed in a two-dimensional manner. With this, an image to be visually recognized by a user as the same image as the input image 100 is displayed on the scanned surface 200. According to the present exemplary embodiment as described above, for example, when a 4k image is displayed, the number of lateral scanning times (that is, lateral scanning frequency) can be reduced to 1/200 as compared to a related-art point-scanning method. For example, when the number of pixels of the light emission display panel 2 in the longitudinal direction is increased, in inverse proportion to this, the lateral scanning frequency can be reduced.

Note that the technical scope of the present disclosure is not limited to the above-described exemplary embodiments, and various modifications can be made to the above-described exemplary embodiments without departing from the spirit and gist of the present disclosure.

Figure 19:
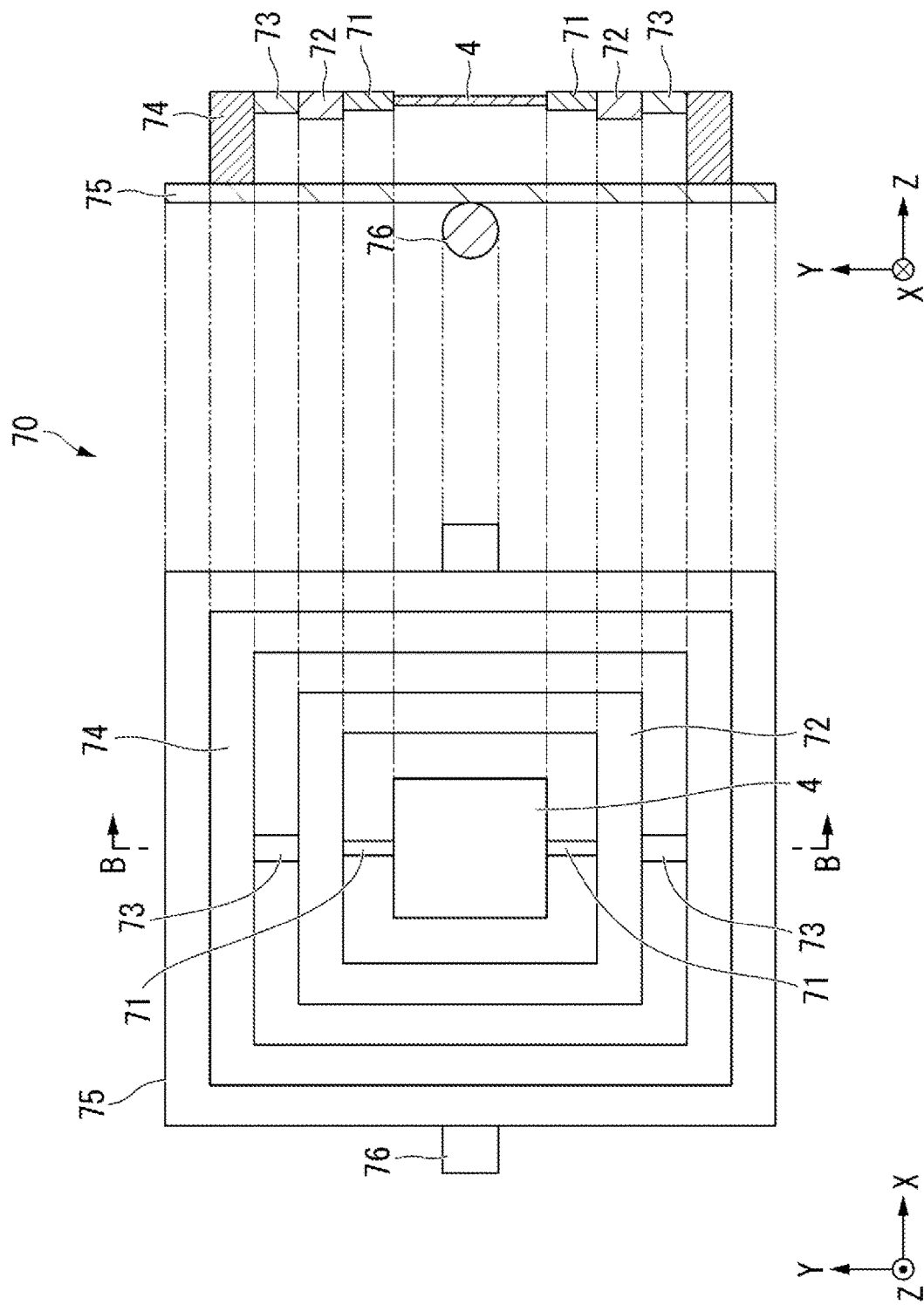
FIG. 19 is a diagram schematically illustrating one example of a mechanical structure of a MEMS scanner for achieving an operation in the step scanning mode in a mechanical structural manner.

For example, an MEMS scanner 70 illustrated in FIG. 19 may be used so as to achieve the operation in the step scanning mode in a mechanical structural manner. In FIG. 19, the diagram on the left side is a plan view of the MEMS scanner 70, and the diagram on the right side is a cross-sectional view of the MEMS scanner 70 taken along the line B-B. In addition to the scanning mirror 4, the MEMS scanner 70 includes a pair of first torsion bars 71, a rotational frame body 72, a pair of second torsion bars 73, a mirror supporting member 74, a base plate 75, and a longitudinal scanning shaft 76.

As illustrated in FIG. 19, the scanning mirror 4 is supported by the pair of first torsion bars 71 in a rotatable manner about the Y-axis on the inner side of the rotational frame body 72 being a plate member having a frame-like shape. The rotational frame body 72 is supported by the pair of second torsion bars 73 in a rotatable manner about the Y-axis on the inner side of the mirror supporting member 74 having a frame-like shape. The mirror supporting member 74 is fixed on a front surface of the base plate 75 being a plate member having a rectangular shape, and has a predetermined height from the front surface of the base plate 75 in the Z-axis direction. In other words, the scanning mirror 4 and the rotational frame body 72 are positioned at a predetermined height from the front surface of the base plate 75. The longitudinal scanning shaft 76 extending in the X-axis direction adheres to a back surface of the base plate 75. The base plate 75 is supported by the longitudinal scanning shaft 76 in a rotatable manner about the X-axis.

Although illustration is omitted in FIG. 19, a coil is provided along outer peripheries of the scanning mirror 4 and the rotational frame body 72 in the MEMS scanner 70, and a magnet is provided so as to surround the scanning mirror 4 and the rotational frame body 72. A driving current is supplied to each coil from the controller 6, and thus the scanning mirror 4 and the rotational frame body 72 rotate about the Y-axis. In other words, the controller 6 controls rotation angles of the scanning mirror 4 and the rotational frame body 72 about the Y-axis.

In the following description, the rotation angle of the scanning mirror 4 with respect to the rotational frame body 72 about the Y-axis is referred to as a "mirror rotation angle $\theta 1$", and the rotation angle of the rotational frame body 72 with respect to the base plate 75 about the Y-axis is referred to as a "frame body rotation angle $\theta 2$". As described later, the rotation angle $\theta$ of the scanning mirror 4 with respect to the base plate 75 about the Y-axis (main scanning rotation angle $\theta$) is a calculated value obtained by adding the mirror rotation angle $\theta 1$ and the frame body rotation angle $\theta 2$. The mirror rotation angle 61 changes at a relatively small deflection angle of approximately ±5 degrees. The frame body rotation angle $\theta 2$ changes at a relatively large deflection angle of approximately ±50 degrees.

The controller 6 controls a motor (not illustrated) that rotates the longitudinal scanning shaft 76, and thus the longitudinal scanning shaft 76 rotates. When the longitudinal scanning shaft 76 rotates, the base plate 75 rotates about the X-axis. As a result, the scanning mirror 4 also rotates about the X-axis. In other words, the controller 6 controls a rotation angle of the scanning mirror 4 about the X-axis (sub scanning rotation angle $\varphi$).

Figure 20:
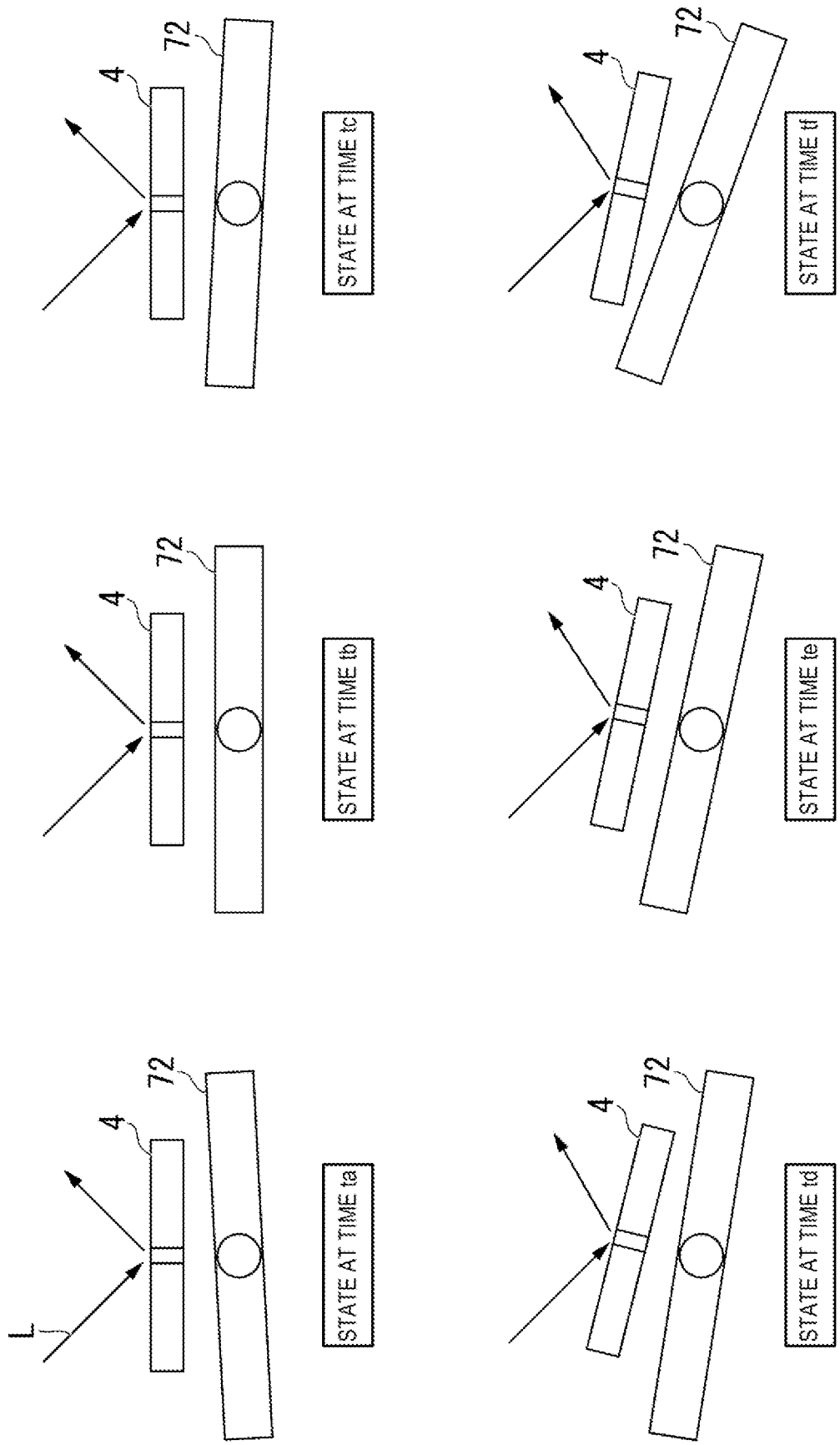
FIG. 20 is a diagram schematically illustrating a state in which the scanning mirror periodically rotates while a rotational frame body continuously rotates.
Figure 21:
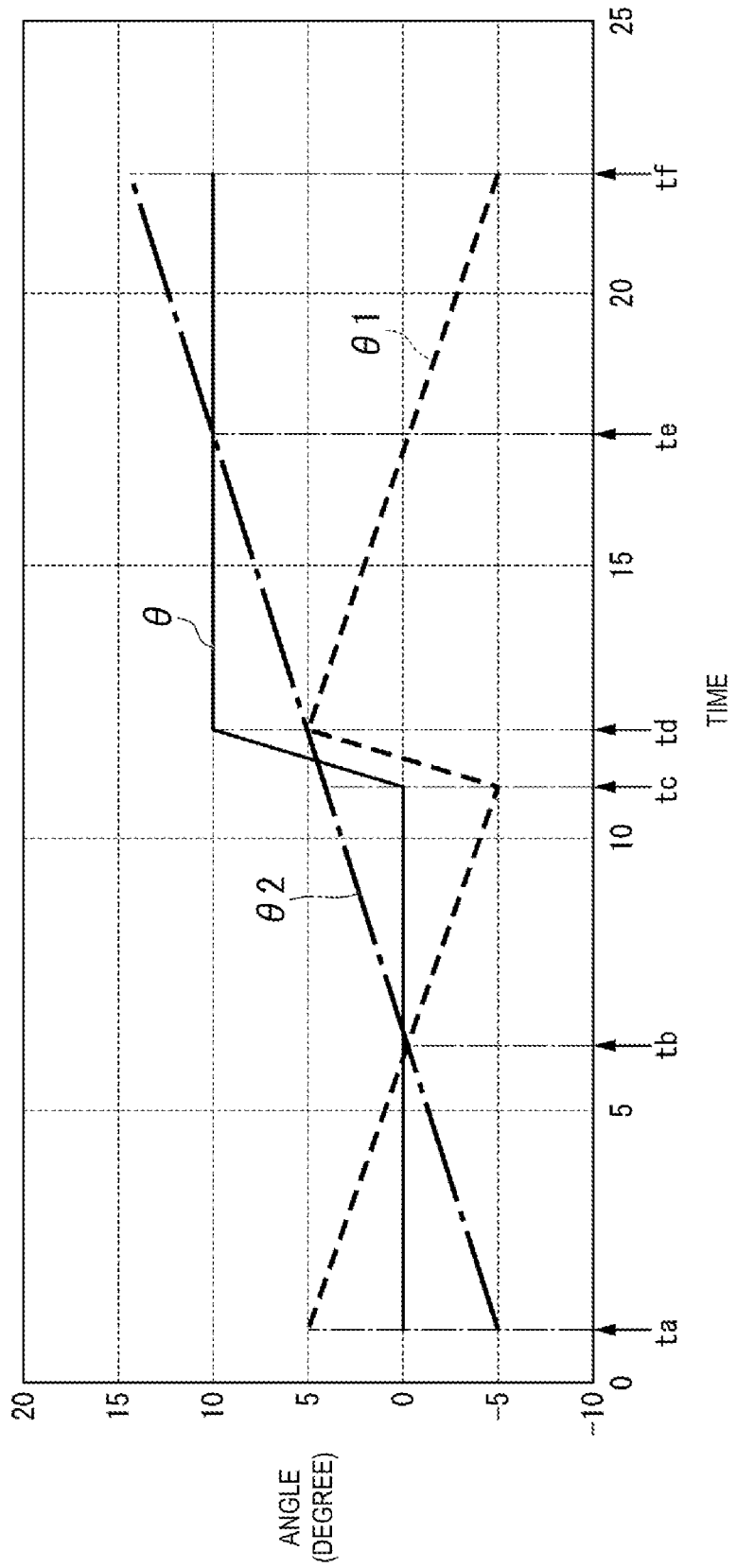
FIG. 21 is a timing chart illustrating a corresponding relationship in time between a mirror rotation angle θ1, a frame body rotation angle θ2, and the main scanning rotation angle θ.

FIG. 20 is a diagram schematically illustrating a state in which the scanning mirror 4 periodically rotates while the rotational frame body 72 continuously rotates. FIG. 21 is a timing chart illustrating a corresponding relationship in time between the mirror rotation angle $\theta 1$, the frame body rotation angle $\theta 2$, and the main scanning rotation angle $\theta$. FIG. 20 illustrates a state of the scanning mirror 4 and the rotational frame body 72 at each timing of times ta, tb, tc, td, te, and tf illustrated in FIG. 21.

As illustrated in FIG. 20 and FIG. 21, in a stat at the time ta, the rotational frame body 72 rotates by 5 degrees with respect to the base plate 75 in a counterclockwise direction, and the scanning mirror 4 rotates by 5 degrees with respect to the rotational frame body 72 in a clockwise direction. In the state at the time ta, the mirror rotation angle $\theta 1$ is 5 degrees, and the frame body rotation angle $\theta 2$ is −5 degrees. Thus, the main scanning rotation angle $\theta$ being a calculated value obtained by adding the mirror rotation angle $\theta 1$ and the frame body rotation angle $\theta 2$ is 0 degree.

From the state at the time ta, the rotational frame body 72 rotates by the same angle with respect to the base plate 75 in a clockwise direction, and the scanning mirror 4 rotates by the same angle with respect to the rotational frame body 72 in a counterclockwise direction. Thus, a state at the time tb is obtained. In the state at the time tb, the rotational frame body 72 is parallel to the base plate 75, and the scanning mirror 4 is also parallel to the rotational frame body 72. In the state at the time tb, each of the mirror rotation angle $\theta 1$ and the frame body rotation angle $\theta 2$ is 0 degree. Thus, the main scanning rotation angle $\theta$ being a calculated value obtained by adding the mirror rotation angle $\theta 1$ and the frame body rotation angle $\theta 2$ is also 0 degree.

From the state at the time tb, the rotational frame body 72 rotates by the same angle with respect to the base plate 75 in a clockwise direction, and the scanning mirror 4 rotates by the same angle with respect to the rotational frame body 72 in a counterclockwise direction. Thus, a state at the time tc is obtained. In the state at the time tc, the rotational frame body 72 rotates by 5 degrees with respect to the base plate 75 in a clockwise direction, and the scanning mirror 4 rotates by 5 degrees with respect to the rotational frame body 72 in a counterclockwise direction. In the state at the time tc, the mirror rotation angle θ1 is −5 degrees, and the frame body rotation angle θ2 is 5 degrees. Thus, the main scanning rotation angle θ being a calculated value obtained by adding the mirror rotation angle 81 and the frame body rotation angle θ2 is 0 degree.

In this manner, for the time period from the time ta to the time tc, the scanning mirror 4 and the rotational frame body 72 rotate by the same angle in the opposite directions, and hence the main scanning rotation angle θ is maintained at 0 degree.

From the state at the time tc, the rotational frame body 72 rotates by 5 degrees with respect to the base plate 75 in a clockwise direction, the scanning mirror 4 rotates by 5 degrees with respect to the rotational frame body 72 in a clockwise direction. Thus, a state at the time td is obtained. In the state at the time td, each of the mirror rotation angle 91 and the frame body rotation angle θ2 is 5 degrees. Thus, the main scanning rotation angle θ being a calculated value obtained by adding the mirror rotation angle θ1 and the frame body rotation angle θ2 is 10 degrees. Therefore, for an extremely short time period from the time tc to the time td, an emission direction of the light reflected by the scanning mirror 4 instantaneously rotates by 20 degrees.

In the state at the time te, the rotational frame body 72 rotates up to 10 degrees with respect to the base plate 75 in a clockwise direction, and the scanning mirror 4 rotates up to 0 degree with respect to the rotational frame body 72 in a counterclockwise direction. In the state at the time te, the mirror rotation angle θ1 is 0 degree, and the frame body rotation angle θ2 is 10 degrees. Thus, the main scanning rotation angle θ being a calculated value obtained by adding the mirror rotation angle θ1 and the frame body rotation angle θ2 is 10 degrees.

In the state at the time tf, the rotational frame body 72 rotates up to 15 degrees with respect to the base plate 75 in a clockwise direction, and the scanning mirror 4 rotates up to −5 degrees with respect to the rotational frame body 72 in a counterclockwise direction. In the state at the time tf, the mirror rotation angle θ1 is −5 degrees, and the frame body rotation angle θ2 is 15 degrees. Thus, the main scanning rotation angle θ being a calculated value obtained by adding the mirror rotation angle θ1 and the frame body rotation angle θ2 is 10 degrees. In this manner, for the time period from the time td to the time tf, the scanning mirror 4 and the rotational frame body 72 rotate by the same angle in the opposite directions, and hence the main scanning rotation angle θ is maintained at 10 degree. The above-described operation from the time ta to the time tf is repeated, and thus the operation in the step scanning mode can be achieved in a mechanical structural manner.

Figure 22:
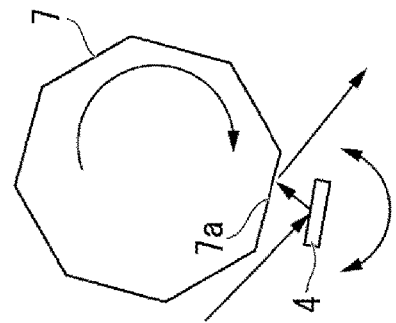
FIG. 22 is a diagram schematically illustrating a combination of the scanning mirror and a polygonal mirror that can achieve an operation in the step scanning mode in a mechanical structural manner.
Figure 22:
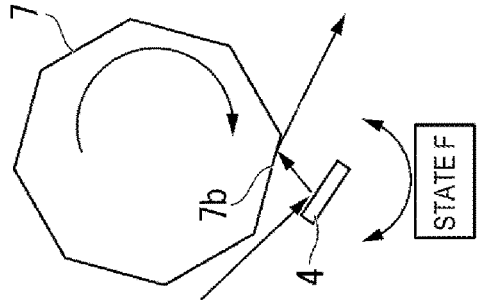
Figure 22:
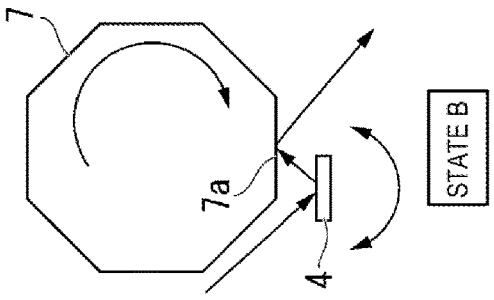
Figure 22:
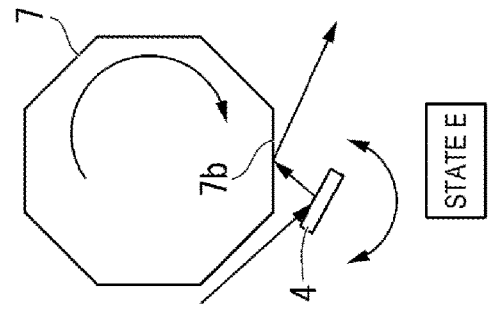
Figure 22:
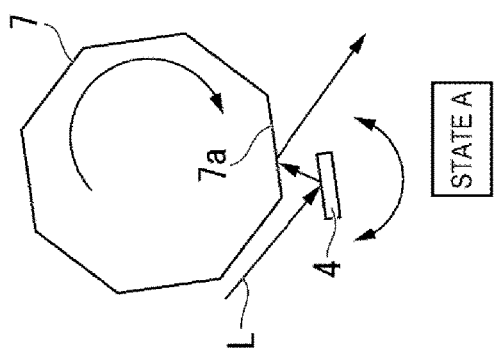
Figure 22:
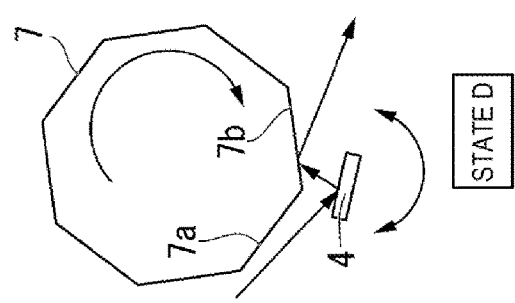

For example, as illustrated in FIG. 22, the scanning mirror 4 and a polygonal mirror 7 are used in combination, and thus the operation in the step scanning mode may be achieved in a mechanical structural manner. The imaging light L incident on the scanning mirror 4 is reflected by the scanning mirror 4 toward any one of a plurality of mirror surfaces provided on an outer periphery of the polygonal mirror 7. The imaging light L incident on the mirror surface of the polygonal mirror 7 from the scanning mirror 4 is reflected by the mirror surface of the polygonal mirror 7 toward the scanned surface 200.

The scanning mirror 4 and the polygonal mirror 7 rotate in a clockwise direction. With this, the scanning mirror 4 and the polygonal mirror 7 rotate while maintaining a constant angle between the mirror surface of the polygonal mirror 7 and the mirror surface of the scanning mirror 4. Thus, the emission direction of the imaging light L is not changed. In FIG. 22, a state A, a state B, and a state C are states in which the imaging light L is reflected by a mirror surface 7a of the polygonal mirror 7, and a state D, a state E, and a state F are states in which the imaging light L is reflected by a mirror surface 7b of the polygonal mirror 7.

The polygonal mirror 7 rotates, and thus the mirror surfaces 7a and 7b of the polygonal mirror 7 are periodically inclined. During the time period in which the mirror surfaces 7a and 7b of the polygonal mirror 7 are periodically inclined, the emission direction of the imaging light L is not changed. While the polygonal mirror 7 rotates, the scanning mirror 4 also revolves. Thus, the emission direction of the imaging light L is changed in a stepwise manner.

The above-described operation from the state A to the state F is repeated, and thus the operation in the step scanning mode can be achieved in a mechanical structural manner.

A projection device according to one aspect of the present disclosure may have the following configuration.

The projection device according to one aspect of the present disclosure includes a light emission display panel in which a plurality of pixels including a light emission element are arranged in a matrix shape, a scanning mirror configured to reflect, toward a scanned surface, imaging light emitted from the light emission display panel and perform two-dimensional scanning of the reflected imaging light on the scanned surface, and a projection optical system configured to guide the imaging light from the light emission display panel to the scanning mirror.

The projection device according to one aspect of the present disclosure may further include a control unit configured to control the light emission display panel and the scanning mirror. The control unit may control rotational motion of the scanning mirror so that a scanning point moves along a predetermined scanning route on the scanned surface, and may control the light emission display panel so that the imaging light is emitted when the scanning point reaches each of a plurality of image display points set in the scanning route.

In the projection device according to one aspect of the present disclosure, the control unit may control rotational motion of the scanning mirror so that the scanning point moves at a constant velocity in a section between two adjacent image display points of the plurality of image display points and stops at a reached image display point of the plurality of image display points for a predetermined time period, and may control the light emission display panel so that the imaging light is emitted within the predetermined time period for which the scanning point stops at the reached image display point.

In the projection device according to one aspect of the present disclosure, the control unit may control rotational motion of the scanning mirror so that the scanning point moves along the scanning route at a constant velocity, and may control the light emission display panel so that the imaging light is emitted when the scanning point reaches each of the plurality of image display points set in the scanning route.

In the projection device according to one aspect of the present disclosure, the control unit may divide an input image into a plurality of subordinate images, and may control the light emission display panel so that the imaging light is emitted when the scanning point reaches each of the plurality of image display points set in the scanning route, the imaging light indicating one of the plurality of subordinate images corresponding to a reached image display point of the plurality of image display points.

In the projection device according to one aspect of the present disclosure, a pair of adjacent subordinate images of the plurality of subordinate images may have an overlap region in which the pair of adjacent subordinate images overlap with each other.

In the projection device according to one aspect of the present disclosure, in each of the plurality of subordinate images, luminance may be gradually reduced from a boundary between the overlap region and another region to an edge of the overlap region.

The projection device according to one aspect of the present disclosure may further include an fθ lens configured to form an image of the imaging light on the scanned surface, the imaging light being reflected by the scanning mirror.

A method of controlling a projection device according to one aspect of the present disclosure may have the following configuration.

A method of controlling a projection device according to one aspect of the present disclosure is a method of controlling a projection device that includes a light emission display panel in which a plurality of pixels including a light emission element are arranged in a matrix shape, a scanning mirror, and a projection optical system configured to guide imaging light from the light emission display panel to the scanning mirror, wherein the scanning mirror reflects, toward a scanned surface, the imaging light emitted from the light emission display panel and performs two-dimensional scanning of the reflected imaging light on the scanned surface.

The method of controlling a projection device according to one aspect of the present disclosure may include controlling rotational motion of the scanning mirror so that a scanning point moves along a predetermined scanning route on the scanned surface, and controlling the light emission display panel so that the imaging light is emitted when the scanning point reaches each of a plurality of image display points set in the scanning route.

What is claimed is:

1. A projection device comprising:
a light emission display panel in which a plurality of pixels including a light emission element are arranged in a matrix shape;
a scanning mirror configured to reflect, toward a scanned surface, imaging light emitted from the light emission display panel, and perform two-dimensional scanning of the reflected imaging light on the scanned surface;
a projection optical system configured to guide the imaging light from the light emission display panel to the scanning mirror; and
a control unit configured to control the light emission display panel and the scanning mirror, wherein
the control unit controls rotational motion of the scanning mirror so that a scanning point moves along a predetermined scanning route on the scanned surface, and controls the light emission display panel so that the imaging light is emitted when the scanning point reaches each of a plurality of image display points set on the scanning route, and
the control unit controls rotational motion of the scanning mirror so that the scanning point moves at a constant velocity between two adjacent image display points of the plurality of image display points and stops at a reached image display point of the plurality of image display points for a predetermined time period, and controls the light emission display panel so that the imaging light is emitted within the predetermined time period when the scanning point stops at the reached image display point.

2. The projection device according to claim 1, wherein the control unit controls rotational motion of the scanning mirror so that the scanning point moves along the scanning route at a constant velocity, and controls the light emission display panel so that the imaging light is emitted when the scanning point reaches each of the plurality of image display points set on the scanning route.

3. The projection device according to claim 1, wherein the control unit divides an input image into a plurality of subordinate images, and controls the light emission display panel so that the imaging light is emitted when the scanning point reaches each of the plurality of image display points set on the scanning route, the imaging light indicating a subordinate image, of the plurality of subordinate images, corresponding to a reached image display point of the plurality of image display points.

4. The projection device according to claim 3, wherein a pair of adjacent subordinate images of the plurality of subordinate images have an overlap region in which the pair of adjacent subordinate images overlap with each other.

5. The projection device according to claim 4, wherein in the subordinate image, luminance is gradually reduced from a boundary between the overlap region and another region toward an edge of the overlap region.

6. The projection device according to claim 1, comprising an fθ lens configured to form, on the scanned surface, an image of the imaging light reflected by the scanning mirror.

7. A projection device comprising:
a light emission display panel in which a plurality of pixels including a light emission element are arranged in a matrix shape;
a scanning mirror configured to reflect, toward a scanned surface, imaging light emitted from the light emission display panel, and perform two-dimensional scanning of the reflected imaging light on the scanned surface;
a projection optical system configured to guide the imaging light from the light emission display panel to the scanning mirror; and
a control unit configured to control the light emission display panel and the scanning mirror, wherein
the control unit controls rotational motion of the scanning mirror so that a scanning point moves along a predetermined scanning route on the scanned surface, and controls the light emission display panel so that the imaging light is emitted when the scanning point reaches each of a plurality of image display points set on the scanning route, and
the control unit controls rotational motion of the scanning mirror so that the scanning point moves along the scanning route at a constant velocity, and controls the light emission display panel so that the imaging light is emitted when the scanning point reaches each of the plurality of image display points set on the scanning route.

8. A projection device comprising:

a light emission display panel in which a plurality of pixels including a light emission element are arranged in a matrix shape;

a scanning mirror configured to reflect, toward a scanned surface, imaging light emitted from the light emission display panel, and perform two-dimensional scanning of the reflected imaging light on the scanned surface;

a projection optical system configured to guide the imaging light from the light emission display panel to the scanning mirror; and a control unit configured to control the light emission display panel and the scanning mirror, wherein the control unit controls rotational motion of the scanning mirror so that a scanning point moves along a predetermined scanning route on the scanned surface, and controls the light emission display panel so that the imaging light is emitted when the scanning point reaches each of a plurality of image display points set on the scanning route, and the control unit divides an input image into a plurality of subordinate images, and controls the light emission display panel so that the imaging light is emitted when the scanning point reaches each of the plurality of image display points set on the scanning route, the imaging light indicating a subordinate image, of the plurality of subordinate images, corresponding to a reached image display point of the plurality of image display points.

* * * * *